US012180607B2

(12) United States Patent
Pfau et al.

(10) Patent No.: US 12,180,607 B2
(45) Date of Patent: Dec. 31, 2024

(54) ELECTROCHEMICAL DEPOSITION SYSTEM INCLUDING OPTICAL PROBES

(71) Applicant: LAM RESEARCH CORPORATION, Fremont, CA (US)

(72) Inventors: Andrew James Pfau, Portland, OR (US); Shantinath Ghongadi, Jr., Tigard, OR (US); Zhian He, Lake Oswego, OR (US); Manish Ranjan, Sherwood, OR (US)

(73) Assignee: LAM RESEARCH CORPORATION, Fremont, CA (US)

( * ) Notice: Subject to any disclaimer, the term of this patent is extended or adjusted under 35 U.S.C. 154(b) by 373 days.

(21) Appl. No.: 17/614,139

(22) PCT Filed: May 19, 2020

(86) PCT No.: PCT/US2020/033644
§ 371 (c)(1),
(2) Date: Nov. 24, 2021

(87) PCT Pub. No.: WO2020/242838
PCT Pub. Date: Dec. 3, 2020

(65) Prior Publication Data
US 2022/0228287 A1    Jul. 21, 2022

Related U.S. Application Data

(60) Provisional application No. 62/852,497, filed on May 24, 2019.

(51) Int. Cl.
*C25D 21/12*    (2006.01)
*C25D 5/00*    (2006.01)
(Continued)

(52) U.S. Cl.
CPC ............. *C25D 21/12* (2013.01); *C25D 5/627* (2020.08); *C25D 17/06* (2013.01); *G01B 11/0633* (2013.01); *G01B 11/0683* (2013.01)

(58) Field of Classification Search
CPC ...................................................... C25D 21/12
See application file for complete search history.

(56) References Cited

U.S. PATENT DOCUMENTS 6,033,548 A    3/2000 Akram et al.
9,045,840 B2    6/2015 Porter et al.
(Continued)

FOREIGN PATENT DOCUMENTS

CN    102534740 A    7/2012
CN    102870236 A    1/2013
(Continued)

OTHER PUBLICATIONS

Chinese Office Action and Search Report for Chinese Application No. 202080053306.7 dated Jan. 25, 2024.
(Continued)

*Primary Examiner* — Brian W Cohen

(57) ABSTRACT

An electrochemical deposition system includes: an electrochemical deposition chamber including an electrolyte for electrochemical deposition; a substrate holder configured to hold a substrate and including a first cathode that is electrically connected to the substrate; a first actuator configured to adjust a vertical position of the substrate holder within the electrochemical deposition chamber; an anode submerged in the electrolyte; a second cathode arranged between the first cathode and the anode; a first optical probe configured to measure a first reflectivity of the substrate at a first distance from a center of the substrate while the substrate is submerged within the electrolyte during the electrochemical deposition; and a controller configured to, based on the first reflectivity, selectively adjust at least one of power applied (Continued)

to the first cathode, power applied to the second cathode, power applied to the anode, and the vertical position of the substrate holder.

19 Claims, 17 Drawing Sheets

(51) Int. Cl.
*C25D 17/06* (2006.01)
*G01B 11/06* (2006.01)

(56) References Cited

U.S. PATENT DOCUMENTS

| | | | |
|---|---|---|---|
| 2001/0009226 A1* | 7/2001 | Moore | C25D 17/001 204/228.8 |
| 2002/0006876 A1* | 1/2002 | Hongo | H01L 21/68728 156/345.12 |
| 2006/0000704 A1* | 1/2006 | Sato | C25D 17/001 204/192.1 |
| 2006/0196775 A1 | 9/2006 | Su et al. | |
| 2006/0266653 A1 | 11/2006 | Birang et al. | |
| 2009/0275264 A1 | 11/2009 | Schlicker et al. | |
| 2012/0258408 A1* | 10/2012 | Mayer | C25D 17/002 204/229.5 |
| 2018/0038009 A1 | 2/2018 | Dinneen et al. | |

FOREIGN PATENT DOCUMENTS

| | | |
|---|---|---|
| CN | 103608490 A | 2/2014 |
| CN | 105132979 A | 12/2015 |
| CN | 105463408 A | 4/2016 |
| CN | 108707940 A | 10/2018 |
| EP | 0666337 A1 | 8/1995 |
| EP | 1067221 A2 | 1/2001 |
| JP | H02298296 A | 12/1990 |
| JP | H05186898 A | 7/1993 |
| JP | 2000204498 A | 7/2000 |
| TW | 497143 B | 8/2002 |
| TW | 201333276 A | 8/2013 |
| TW | 201606142 A | 2/2016 |
| WO | WO-9926275 A2 | 5/1999 |

OTHER PUBLICATIONS

International Search Report and Written Opinion of the ISA issued in PCT/US2020/033644, mailed Sep. 4, 2020; ISA/KR.
Taiwanese Office Action for Taiwanese Application No. 109116825 dated Apr. 9, 2024.

* cited by examiner

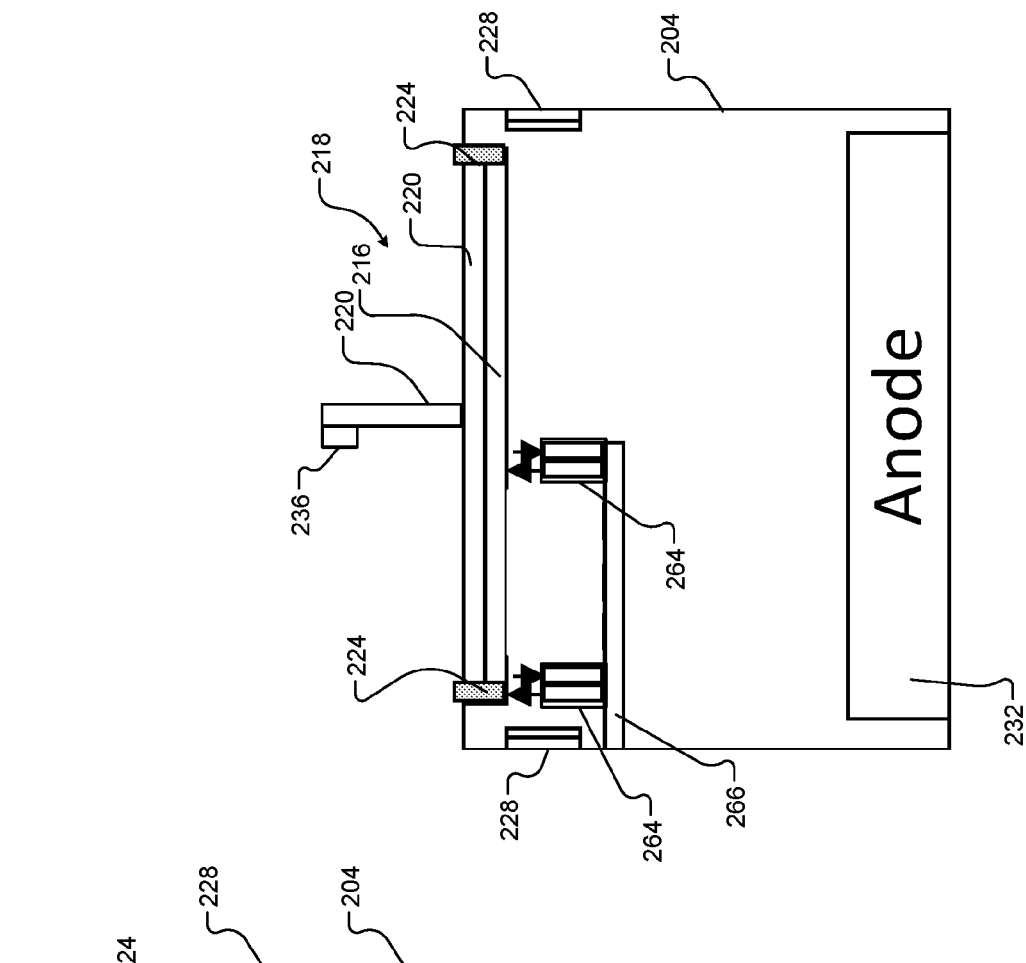
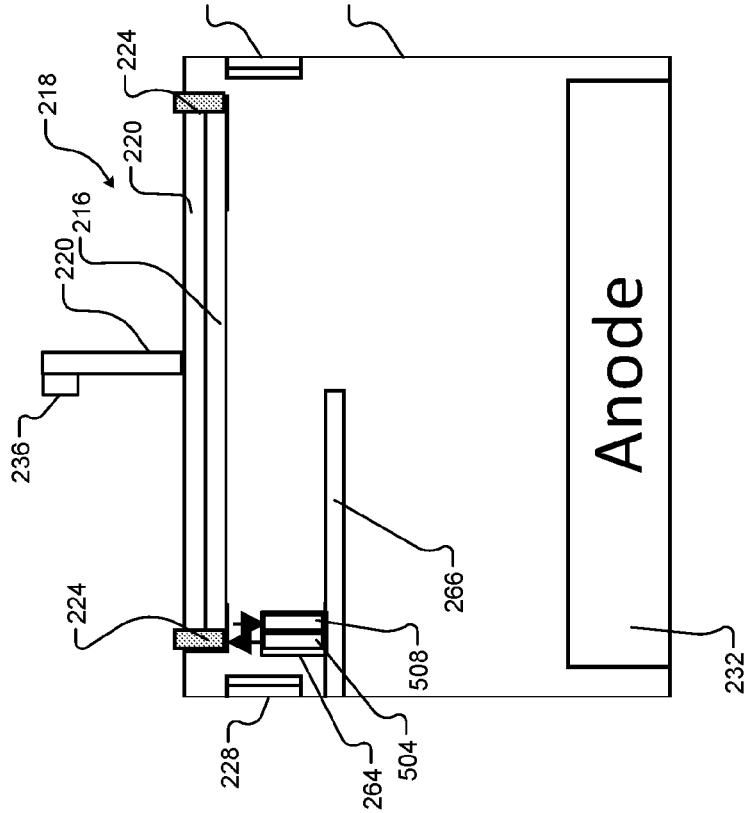

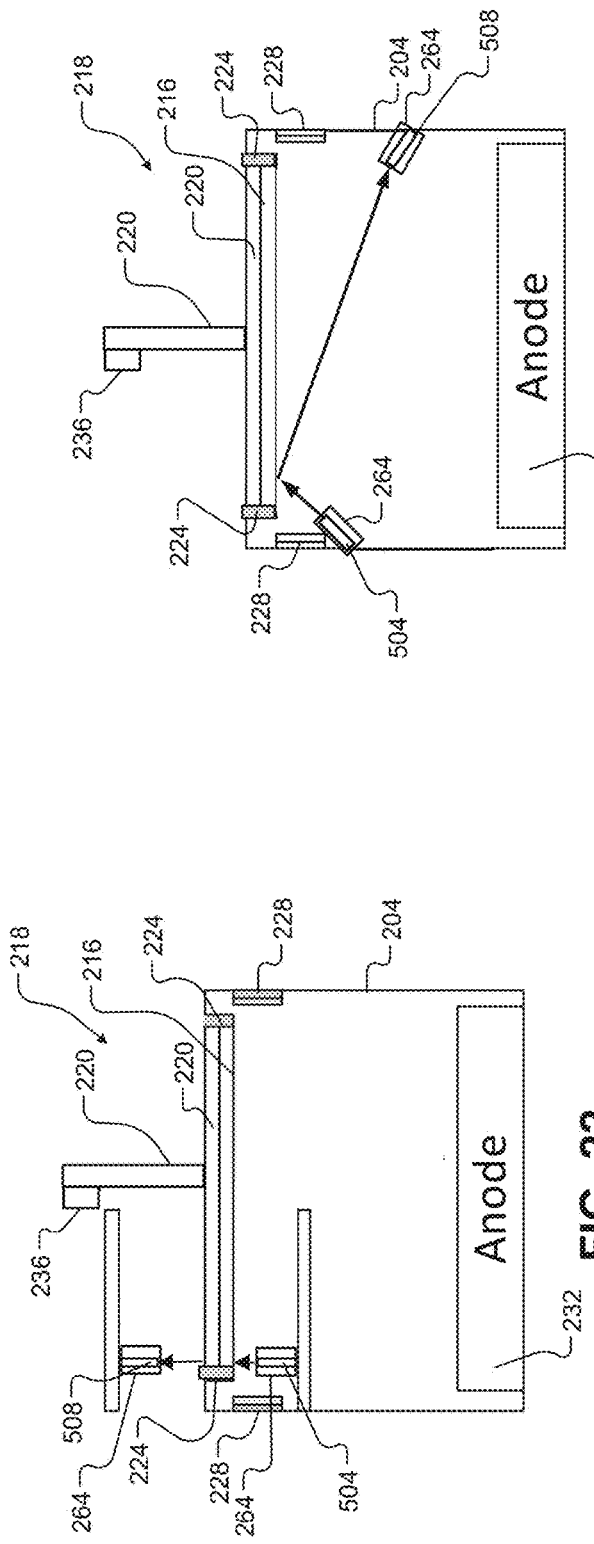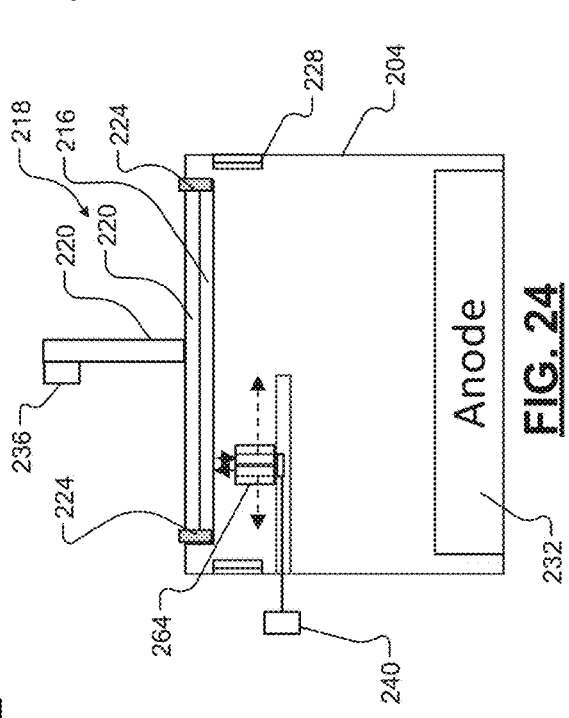

ELECTROCHEMICAL DEPOSITION SYSTEM INCLUDING OPTICAL PROBES

CROSS-REFERENCE TO RELATED APPLICATIONS

This application is a U.S. National Phase Application under 36 U.S.C. 371 of International Application No. PCT/US2020/033644, filed on 19 May 2020, which claims the benefit of U.S. Provisional Application No. 62/852,497, filed on 24 May 2019. The entire disclosures of the applications referenced above are incorporated herein by reference.

FIELD

The present disclosure relates to electrochemical plating systems and more particularly to electrochemical plating systems including optical probes.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Electrochemical deposition may be used to fill features (e.g., trenches and/or vias) in a substrate with material from the bottom of the features to the top of the features (i.e., bottom-up). Excess material deposited above the tops of the features can be removed, for example, by a chemical-mechanical planarization (CMP) process. In some examples, the material may be a metal, such as copper, cobalt, tungsten, tin, silver, gold, ruthenium, titanium, tantalum, and oxides, nitrides, and alloys of the above.

Control of the deposition uniformity may help to provide a uniform film for CMP and to minimize voids in the features. If the material does not have a uniform thickness, under-polishing or over-polishing may occur during CMP. For example, over-polishing may occur in thin regions, and under-polishing may occur in thick regions. Over-polishing or under-polishing may increase voids and/or other defects. An increase in voids and/or other defects may additionally or alternatively occur if there is a difference between a first feature fill rate near the edges of a substrate and a second feature fill rate near a center of the substrate. Defects in an integrated circuit can lead to an electrical failure of the integrated circuit.

SUMMARY

In a feature, an electrochemical deposition system includes: an electrochemical deposition chamber including an electrolyte for electrochemical deposition; a substrate holder configured to hold a substrate and including a first cathode that is electrically connected to the substrate; a first actuator configured to adjust a vertical position of the substrate holder within the electrochemical deposition chamber; an anode that is submerged in the electrolyte; a second cathode that is arranged between the first cathode and the anode; a first optical probe configured to measure a first reflectivity of the substrate at a first distance from a center of the substrate while the substrate is submerged within the electrolyte during the electrochemical deposition; and a controller configured to, during the electrochemical deposition, based on the first reflectivity of the substrate, selectively adjust at least one of (i) power applied to the first cathode, (ii) power applied to the second cathode, (iii) power applied to the anode, and (iv) the vertical position of the substrate holder.

In a feature, a second optical probe is configured to measure a second reflectivity of the substrate at a second distance from the center of the substrate while the substrate is submerged within the electrolyte during the electrochemical deposition. The controller is configured to, during the electrochemical deposition, further based on the second reflectivity of the substrate, selectively adjust at least one of (i) the power applied to the first cathode, (ii) the power applied to the second cathode, (iii) the power applied to the anode, and the (iv) vertical position of the substrate holder.

In a feature, the first distance is different than the second distance.

In a feature, the controller is configured to, during the electrochemical deposition, based on a difference between the first reflectivity and the second reflectivity, selectively adjust at least one of (i) the power applied to the first cathode, (ii) the power applied to the second cathode, (iii) the power applied to the anode, and the (iv) vertical position of the substrate holder.

In a feature, the controller is configured to, during the electrochemical deposition: determine a first adjustment based on the difference; and apply power to the first cathode based on the first adjustment and a value selected from a first profile.

In a feature, the controller is configured to, during the electrochemical deposition: determine a second adjustment based on the difference; and apply power to the second cathode based on the second adjustment and a value selected from a second profile.

In a feature, the controller is configured to, during the electrochemical deposition: determine a third adjustment based on the difference; and adjust the vertical position of the substrate holder based on the third adjustment and a value selected from a third profile.

In a feature, the first optical probe includes: a first light source configured to transmit light normal to a surface of the substrate while the substrate is submerged within the electrolyte during the electrochemical deposition; and a first light detector configured to receive light normal to the surface of the substrate while the substrate is submerged within the electrolyte during the electrochemical deposition.

In a feature, the first optical probe includes: a first light source configured to transmit light at a non-90 degree angle with respect to a surface of the substrate while the substrate is submerged within the electrolyte during the electrochemical deposition; and a first light detector configured to receive light at a non-90 degree angle with respect to the surface while the substrate is submerged within the electrolyte during the electrochemical deposition.

In a feature, a window is located between the first optical probe and the substrate. The first optical probe is configured to transmit and receive light through the window while the substrate is submerged within the electrolyte during the electrochemical deposition.

In a feature, the first optical probe includes: a first light source configured to transmit light normal to a surface of the substrate while the substrate is submerged within the electrolyte during the electrochemical deposition; and a first light detector configured to receive light through the substrate while the substrate is submerged within the electrolyte during the electrochemical deposition.

In a feature, the first optical probe is located on a horizontally extending bar.

In a feature, the first optical probe is mounted to a wall of the electrochemical deposition chamber.

In a feature, the first optical probe is configured to transmit and receive only a single wavelength of light.

In a feature, the first optical probe is configured to transmit and receive light within a wavelength range.

In a feature, a second actuator is configured to rotate the substrate holder during the electrochemical deposition.

In a feature, the controller is further configured to, during the electrochemical deposition: based on the first reflectivity of the substrate, detect an endpoint of the electrochemical deposition; and in response to the detection of the endpoint, selectively adjust at least one of (i) the power applied to the first cathode, (ii) the power applied to the second cathode, (iii) the power applied to the anode, and (iv) the vertical position of the substrate holder.

In a feature, the controller is further configured to, during the electrochemical deposition: based on the first reflectivity of the substrate, determine a depth of features formed in the substrate; and based on the depth of the features formed in the substrate, selectively adjust at least one of (i) the power applied to the first cathode, (ii) the power applied to the second cathode, (iii) the power applied to the anode, and (iv) the vertical position of the substrate holder.

In a feature, the controller is further configured to, during the electrochemical deposition: based on the first reflectivity of the substrate, detect a fault; and in response to the detection of the fault, display an indicator of the fault on a display.

In a feature, the controller is configured to: determine an average of a plurality of first reflectivities of the substrate measured during an amount of rotation of the substrate during the electrochemical deposition; and during the electrochemical deposition, based on the average, selectively adjust at least one of (i) the power applied to the first cathode, (ii) the power applied to the second cathode, (iii) the power applied to the anode, and (iv) the vertical position of the substrate holder.

In a feature, an actuator is configured to, while the substrate is submerged within the electrolyte, move the first optical probe from the first distance from the center of the substrate to a second distance from the center of the substrate that is different than the first distance. The controller is configured to, during the electrochemical deposition, based on a first value of the first reflectivity measured when the first optical probe is the first distance from the center of the substrate and a second value of the first reflectivity measured when the first optical probe is the second distance from the center of the substrate, selectively adjust the at least one of (i) the power applied to the first cathode, (ii) the power applied to the second cathode, (iii) the power applied to the anode, and (iv) the vertical position of the substrate holder.

In a feature, the controller is configured to, during the electrochemical deposition, based on the first reflectivity of the substrate, selectively adjust at least one of (i) the power applied to the first cathode, (ii) the power applied to the second cathode, (iii) the power applied to the anode, (iv) the vertical position of the substrate holder, (v) an angle of the substrate, and (vi) a distance between the first cathode and the second cathode.

In a feature, an electrochemical deposition system includes: an electrochemical deposition chamber configured to contain an electrolyte for electrochemical deposition; a substrate holder including a first cathode; a first actuator configured to adjust a vertical position of the substrate holder within the electrochemical deposition chamber; an anode; a second cathode that is arranged between the first cathode and the anode; and an optical probe configured to measure a reflectivity of a substrate during the electrochemical deposition.

In further features, the electrochemical deposition system further includes a second optical probe configured to measure a second reflectivity of the substrate during the electrochemical deposition.

In further features, the optical probe includes: a light source configured to transmit light normal to a surface of the substrate; and a light detector configured to receive light normal to the surface of the substrate.

In further features, the optical probe includes: a light source configured to transmit light at a non-90 degree angle with respect to a surface of the substrate; and a light detector configured to receive light at a non-90 degree angle with respect to the surface.

In further features, the electrochemical deposition system further includes a window located between the optical probe and the substrate, where the optical probe is configured to transmit and receive light through the window.

In further features, the optical probe includes: a light source configured to transmit light normal to a surface of the substrate; and a light detector configured to receive light through the substrate.

In further features, the electrochemical deposition system further includes a bar, where the optical probe is located on the bar.

In further features, the optical probe is mounted to a wall of the electrochemical deposition chamber.

In further features, the optical probe is configured to transmit and receive only a single wavelength of light.

In further features, the optical probe is configured to transmit and receive light within a wavelength range.

In further features, the electrochemical deposition system further includes a second actuator configured to move the optical probe one of toward and away from a center of the substrate.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 18-24 include cross-sectional views including an example portion of a chamber including one or more optical probes.

In the drawings, reference numbers may be reused to identify similar and/or identical elements.

DETAILED DESCRIPTION

Features formed in a dielectric layer of a substrate can be filled with material (e.g., metal) using electrochemical deposition within a processing chamber. The substrate contacts a first electrode. An anode is located at a bottom of the processing chamber. An electric field within the processing chamber can be varied by varying at least one of (a) distance between the substrate and (b) at least one of power applied to the first electrode, power applied to a second electrode, and power applied to the anode. Trial and error based on characteristics of substrates before and after deposition can be used to calibrate a target first cathode current profile, a target second cathode current profile, and a target distance profile to be followed during electrochemical deposition.

According to the present disclosure, in-situ characteristics measured during deposition are used to increase thickness uniformity and increase fill rate uniformity of the deposited material. For example, one or more optical probes measure one or more reflectivities of a substrate during deposition of the material on the substrate. Reflectivity generally increases as material (e.g., metal) is deposited on the substrate. A controller selectively adjusts the distance between the substrate based on the one or more reflectivities. Additionally or alternatively, the controller may selectively adjust at least one of the power applied to the first electrode, the power applied to the second electrode, and the power applied to the anode based on the one or more reflectivities. The closed-loop adjustment during deposition may increase thickness uniformity and increase fill rate uniformity of the deposited material. Increasing thickness uniformity and/or increasing fill rate uniformity may decrease defect counts.

Figure 1:
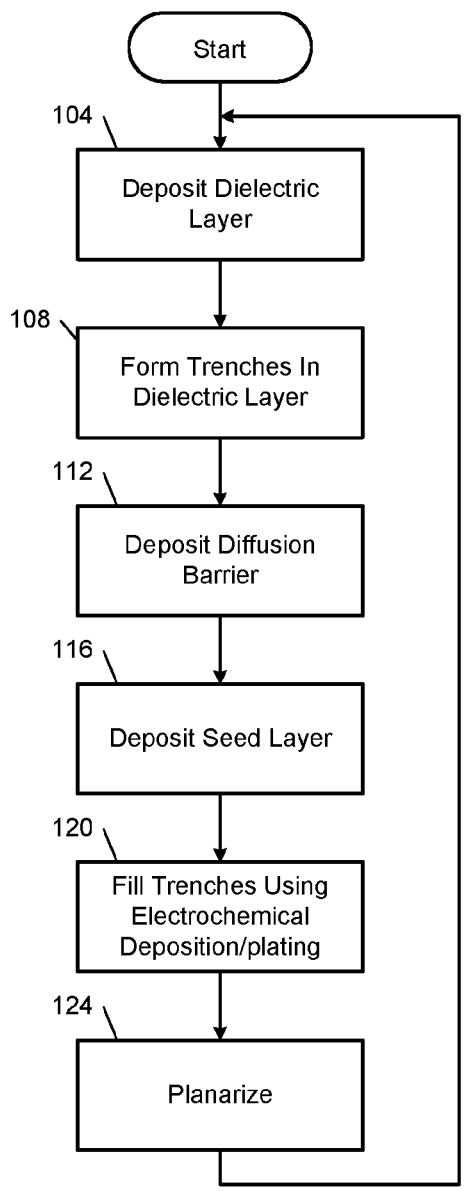
FIG. 1 is a flowchart depicting an example method of processing a substrate to produce an integrated circuit.

FIG. 1 is a flowchart depicting an example method of processing a substrate to produce an integrated circuit. At 104, a dielectric layer is deposited on the substrate. At 108, features (e.g., trenches and/or vias) are formed in the dielectric layer, such as by patterning and etching. At 112, a diffusion barrier is applied to the substrate, such as by chemical vapor deposition (CVD) or physical vapor deposition (PVD).

At 116, a seed layer for a material (e.g., metal) is applied to the substrate. The seed layer may be applied, for example, via CVD or PVD. The seed layer may include, for example, titanium nitride or another suitable seed material for the material. Examples of the metal include copper, cobalt, tungsten, tin, silver, gold, ruthenium, titanium, tantalum, and oxides, nitrides, and alloys of the above. At 120, the features are filled with the material. The features may be filled, for example, using electrochemical deposition, from the bottom of the features to the tops of the features. The electrochemical deposition is discussed further below. At 124, excess of the electrically conductive material is removed, such as by chemical-mechanical planarization (CMP). Control may then return to 104.

Figure 2A:
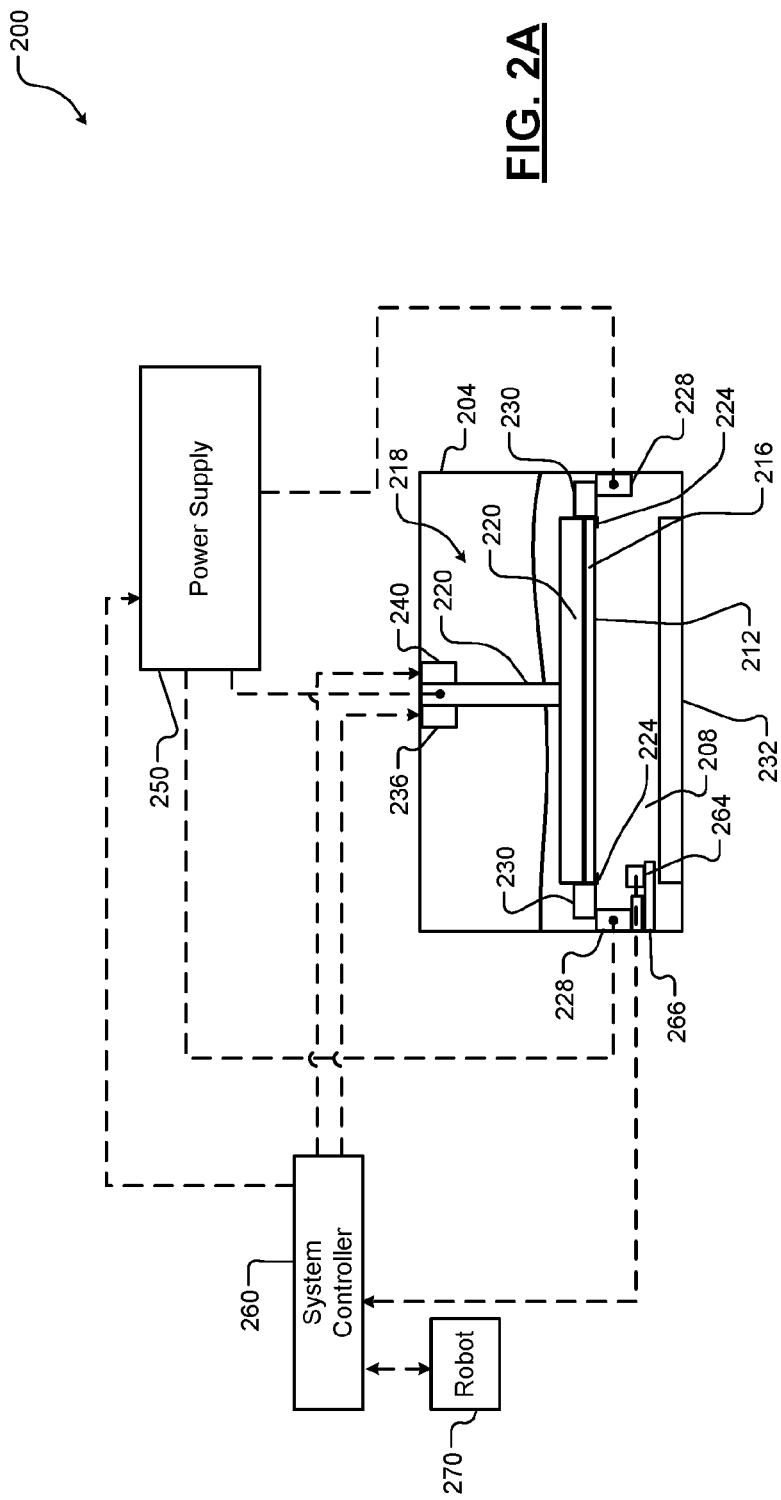
FIGS. 2A-2B are a functional block diagram of an example implementation of an electrochemical deposition system.

FIG. 2A is a functional block diagram of an example implementation of an electrochemical deposition system 200 including an electrochemical deposition chamber 204. The chamber 204 contains a bath of an electrolyte 208 that is used to deposit the material (e.g., metal) within features formed in a lower surface 212 of a substrate 216. The electrolyte 208 may include ions of the material (e.g., metal) that is deposited onto the substrate 216.

The substrate 216 is suspended from the substrate holder 218 that includes a first cathode 220. The first cathode 220 electrically contacts outer edges of the substrate 216. For example, the first cathode 220 may include one or more clamping elements 224, such as a plurality of gripping elements, that hold the substrate 216 to the substrate holder 218. The first cathode 220 may be made of an electrically conductive material. The clamping elements 224 may also be made of an electrically conductive material. The first cathode 220 may electrically contact outer edges of the substrate 216 via the clamping elements 224.

The substrate holder 218 may also include a second cathode 228 that is electrically isolated from the first cathode 220, such as via isolator 230. For example, the second cathode 228 may be an annular ring. The second cathode 228 may be made of an electrically conductive material, such as platinum coated titanium.

An anode 232 is submerged in the electrolyte 208 and is electrically isolated from the first cathode 220. The anode 232 may be fixed to a bottom surface of the chamber 204. The anode 232 may be made of an electrically conductive material, such as copper or cobalt.

Figure 2B:
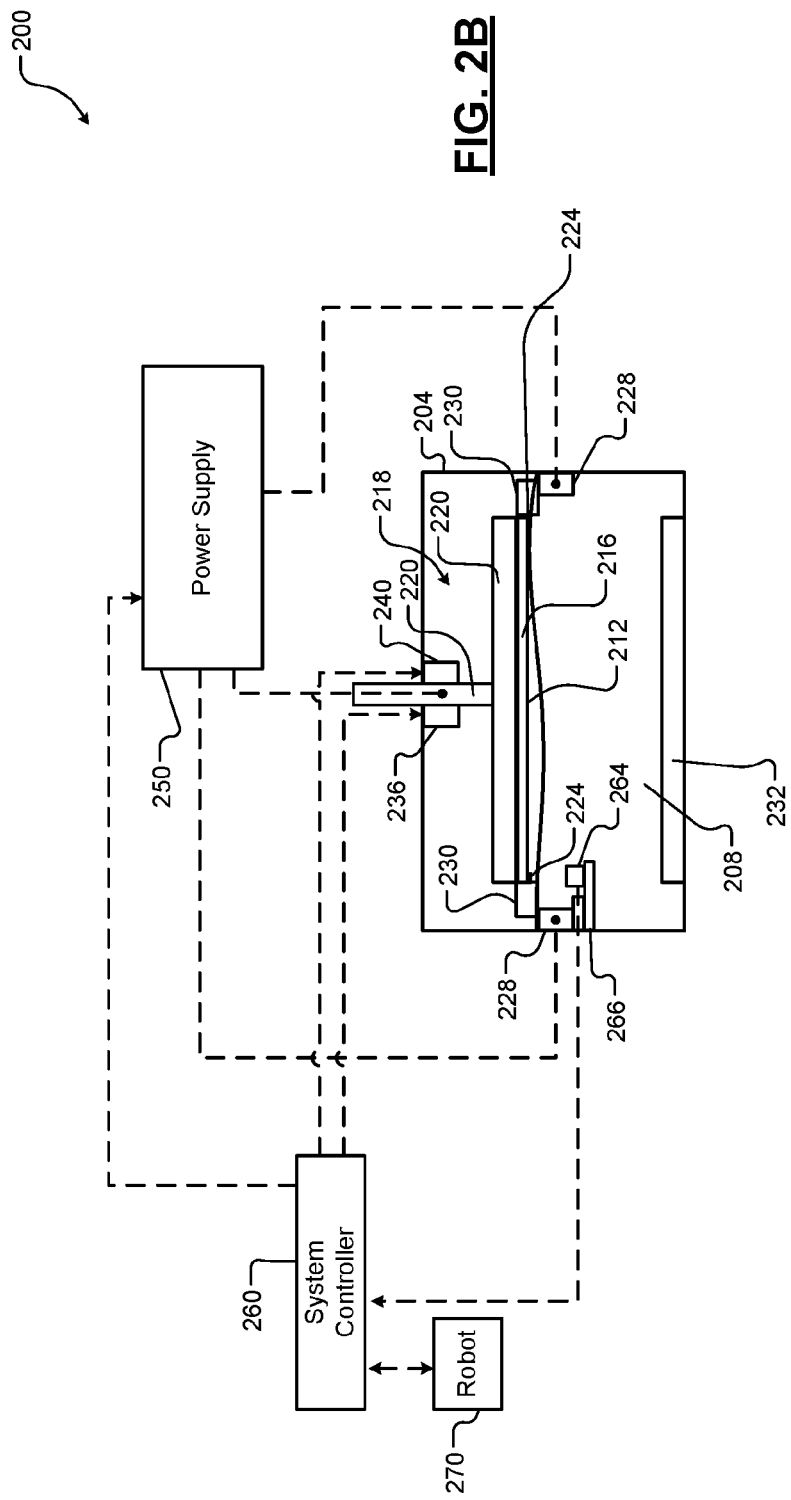

A first actuator 236 raises and lowers the substrate holder 218. The first actuator 236 therefore controls a distance between the substrate 216 and the anode 232. For example only, the first actuator 236 may include a linear actuator or another suitable type of actuator. FIG. 2A illustrates an example where the first actuator 236 lowered the substrate 216 to a first position such that the substrate 216 is submerged in the electrolyte 208 for deposition of the material within the features formed in the lower surface 212 of the substrate 216. FIG. 2B illustrates an example where the first actuator 236 raised the substrate 216 to a second position such that the substrate 216 is not submerged in the electrolyte 208.

A second actuator 240 rotates substrate holder 218. The second actuator 240 may include, for example, an electric motor that drives rotation of the substrate holder 218 at a rotational speed. The second cathode 228 may rotate with the substrate holder 218 or may not rotate while the substrate holder 218 rotates.

A power supply 250 applies power to the first cathode 220, the second cathode 228, and the anode 232. The power applied to the first cathode 220, the second cathode 228, and the anode 232, and locations of the first and second cathodes 220 and 228 relative to the anode 232, dictate the shape of the electric field within the chamber 204. A system controller 260 controls the power applied to the first cathode 220, the second cathode 228, and the anode 232 by the power supply 250. The system controller 260 also controls the distance between the substrate 216 and the anode 232 via the first actuator 236. The system controller 260 also controls rotation of the substrate holder 218 via the second actuator 240.

Based on measurements from one or more optical probes 264 within the chamber 204, the system controller 260 controls the distance between the substrate 216 and the anode 232, and the power applied to the first cathode 220, the second cathode 228, and the anode 232. The one or more optical probes 264 measure, for example, reflectivity of the lower surface 212 of the substrate 216 while the substrate 216 is within the electrolyte 208. Controlling the position of the first cathode 220 and the power applied may increase a uniformity of a thickness of the material deposited on the substrate 216 and increase a uniformity of fill rates across the substrate 216.

The one or more optical probes 264 may be located on a horizontally extending bar 266 or tab. The bar 266 may be suspended from the substrate holder 218. The bar 266 may rotate with the substrate holder 218 or may be fixed and not rotate while the substrate holder 218 rotates. Alternatively, the bar 266 may be fixed, such as to a wall of the chamber 204.

A robot 270 may deliver substrates to and remove substrates from the substrate holder 218. For example, the robot 270 may transfer substrates to and from the substrate holder 218. The system controller 260 may control operation of the robot 270.

Figure 3B:
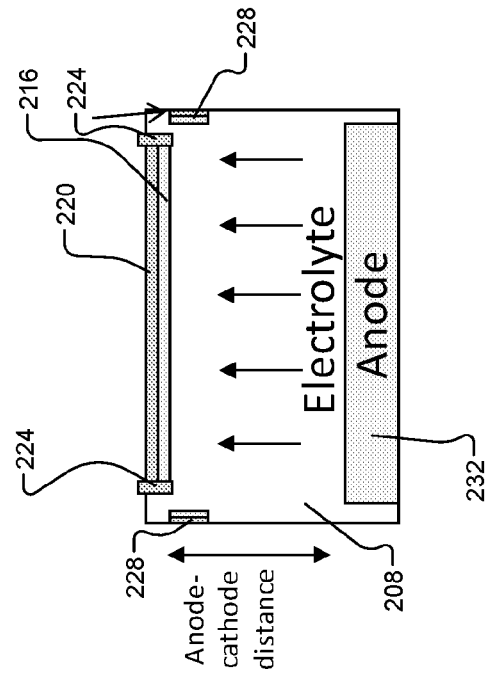
FIG. 3B illustrates a second example distance between a substrate and an anode and an example electric field nearer to an end of electrochemical deposition.
Figure 3A:
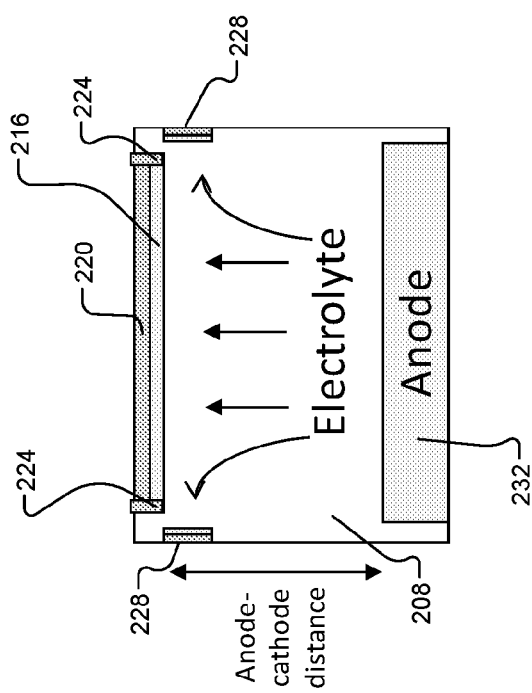
FIG. 3A illustrates a first example distance between a substrate and an anode and an example electric field at a beginning of electrochemical deposition.

FIGS. 3A and 3B include cross-sectional views illustrating example positions and electric fields during electrochemical deposition of the material within the features of the substrate 216. A first resistance of the substrate 216 at a beginning of the electrochemical deposition is higher than a second resistance of the substrate 216 at an end of the electrochemical deposition. As the material (e.g., metal) is deposited on the substrate 216, the resistance of the substrate 216 generally decreases.

FIG. 3A illustrates a first example distance between the substrate 216 and the anode 232 and an example electric field at a beginning of the electrochemical deposition. At the beginning of the electrochemical deposition, the electric field and current density will naturally be higher near where the substrate 216 is electrically contacted at its edge. The system controller 260 compensates for this by applying a first current to the second cathode 228 that results in a more uniform electric field and current density to the first cathode 220.

FIG. 3B illustrates a second example distance between the substrate 216 and the anode 232 and an example electric field nearer to an end of the electrochemical deposition. At the end of the electrochemical deposition, the resistance of the substrate 216 may be negligible. The system controller 260 may decrease or increase the distance between the substrate 216 and the anode 232 as the end of the electrochemical deposition nears and decrease or disable current to the second cathode 228. The adjusted distance and the decreased current to the second cathode 228 results in a more uniform electric field and current density to the first cathode 220.

Figure 4:
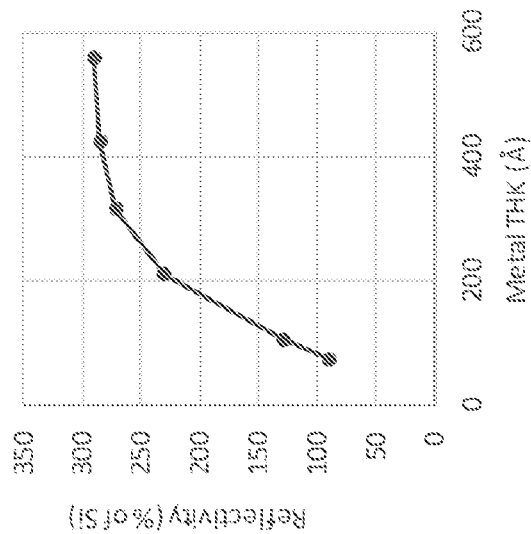
FIG. 4 includes an example graph of reflectivity of a substrate versus thickness of material deposited on the substrate.

FIG. 4 includes an example graph of reflectivity of a substrate versus thickness of material deposited on the substrate. As shown, reflectivity increases as material (e.g., metal) thickness increases on a substrate. Reflectivity plateaus once the material thickness is thick enough to fully reflect incident electromagnetic radiation from the one or more optical probes 264.

Figure 5:
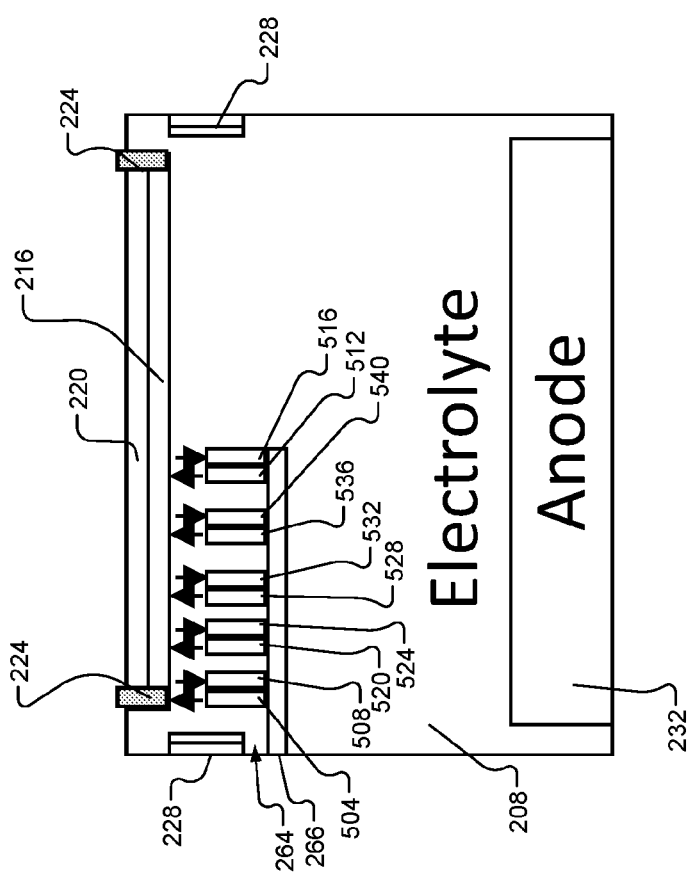

FIG. 5 includes a cross-sectional view including an example portion of the chamber 204. In various implementations, the one or more optical probes 264 may include two or more optical probes. For example, a first optical probe may include a first light source 504 and a first light detector 508. The first light source 504 and the first light detector 508 are configured to transmit and receive light from a first location near or at the outer edge of the substrate 216. The first light source 504 outputs light toward the substrate 216. The first light detector 508 receives light from the first light source 504 that is reflected by the substrate 216.

A second optical probe may include a second light source 512 and a second light detector 516. The second light source 512 and the second light detector 516 are arranged radially inwardly from the first light source 504 and the first light detector 508. The second light source 512 and the second light detector 516 are configured to transmit and receive light from a second location that is radially inward of the first location. The second location may be near or at a center of the substrate 216. The second light source 512 outputs light toward the substrate 216. The second light detector 516 receives light from the second light source 512 that is reflected by the substrate 216.

In various implementations, one or more other optical probes may be arranged radially between the first optical probe and the second optical probe. For example, a third optical probe may include a third light source 520 and a third light detector 524. The third light source 520 and the third light detector 524 are arranged radially inwardly from the first light source 504 and the first light detector 508 and radially outwardly from the second light source 512 and the second light detector 516. The third light source 520 and the third light detector 524 are configured to transmit and receive light from a third location that is radially outward of the second location and radially inward of the first location. The third light source 520 outputs light toward the substrate 216. The third light detector 524 receives light from the third light source 520 that is reflected by the substrate 216.

A fourth optical probe may include a fourth light source 528 and a fourth light detector 532. The fourth light source 528 and the fourth light detector 532 are arranged radially inwardly from the third light source 520 and the third light detector 524 and radially outwardly from the second light source 512 and the second light detector 516. The fourth light source 528 and the fourth light detector 532 are configured to transmit and receive light from a fourth location that is radially outward of the second location and radially inward of the third location. The fourth light source 528 outputs light toward the substrate 216. The fourth light detector 532 receives light from the fourth light source 528 that is reflected by the substrate 216.

A fifth optical probe may include a fifth light source 536 and a fifth light detector 540. The fifth light source 536 and the fifth light detector 540 are arranged radially inwardly from the fourth light source 528 and the fourth light detector 532 and radially outwardly from the second light source 512 and the second light detector 516. The fifth light source 536 and the fifth light detector 540 are configured to transmit and receive light from a fifth location that is radially outward of the second location and radially inward of the fourth location. The fifth light source 536 outputs light toward the substrate 216. The fifth light detector 540 receives light from the fifth light source 536 that is reflected by the substrate 216.

In various implementations, one or more of the third, fourth, and fifth optical probes may be omitted. In various implementations, more than five optical probes may be included.

The first, second, third, fourth, and fifth light detectors 508, 516, 524, 532, and 540 generate and output signals based on the light reflected off of the substrate 216 to the first, second, third, fourth, and fifth light detectors 508, 516, 524, 532, and 540. The outputs of the first, second, third, fourth, and fifth light detectors 508, 516, 524, 532, and 540 correspond to reflectivities of the substrate 216 at the first, second, third, fourth, and fifth locations, respectively. The outputs of the first, second, third, fourth, and fifth light detectors 508, 516, 524, 532, and 540 therefore correspond to thicknesses of the material deposited at the first, second, third, fourth, and fifth locations, respectively.

The first, second, third, fourth, and fifth light sources 504, 512, 520, 528, and 536 may transmit light normal to the lower surface 212 of the substrate 216. The first, second, third, fourth, and fifth light detectors 508, 516, 524, 532, and 540 may receive light normal to the lower surface 212 of the substrate 216. In this example, both the incident (transmitted) and reflected light are normal to the lower surface 212 of the substrate 216.

Figure 6:
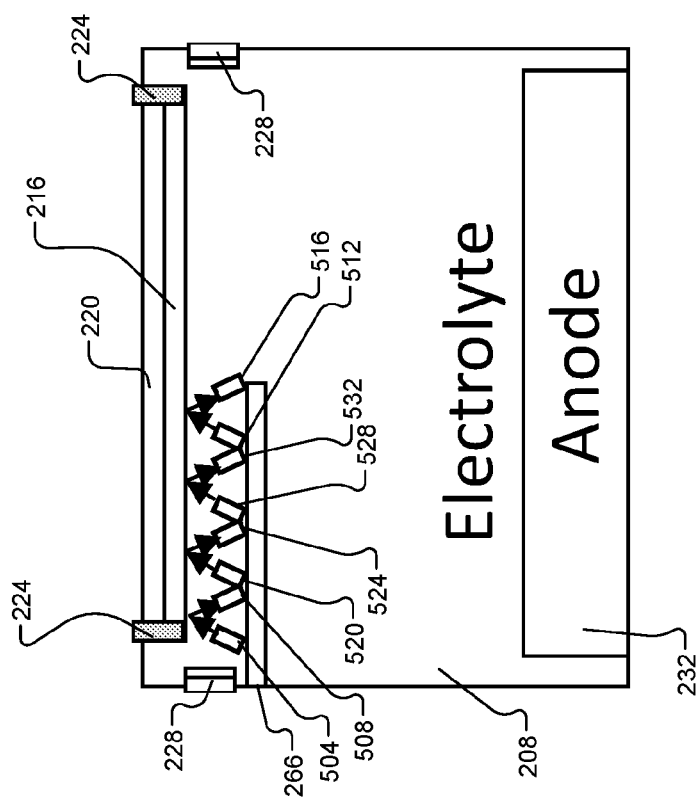
FIGS. 5-10 include cross-sectional views including an example portion of a chamber including one or more optical probes.

FIG. 6 includes a cross-sectional view including an example portion of the chamber 204. In the example of FIG. 6, the first, second, third, and fourth light sources 504, 512, 520, and 528 transmit light at a non-90 degree angle with respect to the lower surface 212 of the substrate 216. The first, second, third, and fourth light detectors 508, 516, 524, and 532 receive light at a non-90 degree angle with respect to the lower surface 212 of the substrate 216.

The first, second, third, and fourth light sources 504, 512, 520, and 528 transmit light at different locations on the substrate 216, as shown. For example, the first light source 504 transmits light near the edge of the substrate 216 and the second light source 512 transmits light at or near the center of the substrate 216. The third and fourth light sources 520 and 528 transmit light at locations between the edge and the center of the substrate 216.

Figure 7:
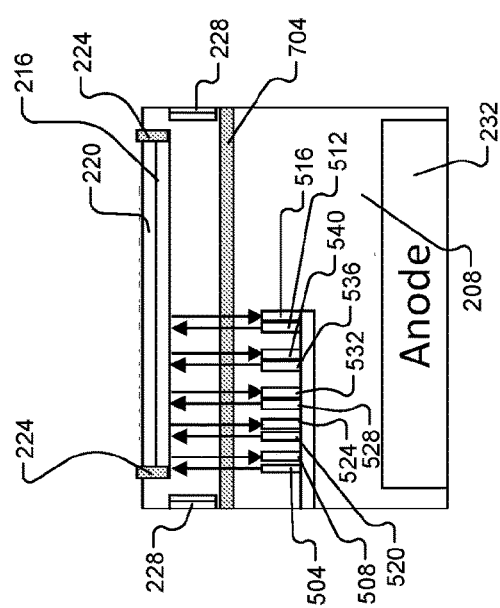

FIG. 7 includes a cross-sectional view including an example portion of the chamber 204. In various implementations, a window 704 may be located between the one or more optical probes and the substrate 216. In this example, the electrolyte 208 may be circulated above and below the window 704. The window 704 may be fixed to the walls of the chamber 204 or to the substrate holder 218.

Figure 8:
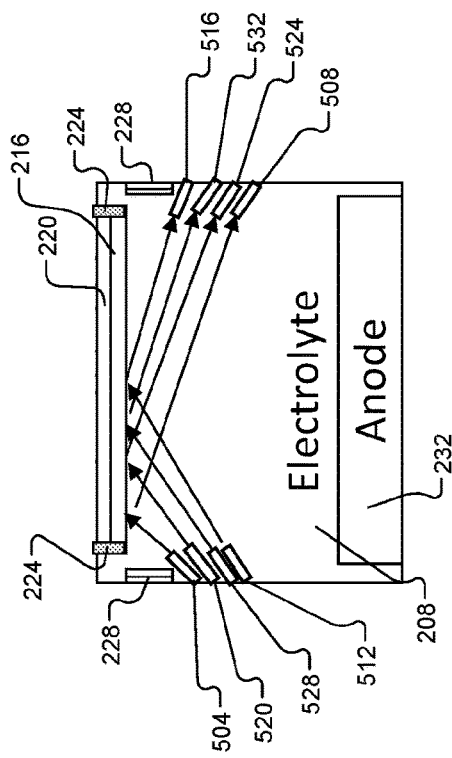

FIG. 8 includes a cross-sectional view including an example portion of the chamber 204. In various implementations, the optical probes may be fixed to walls of the chamber 204. The first, second, third, and fourth light sources 504, 512, 520, and 528 transmit light at a non-90 degree angle with respect to the lower surface 212 of the substrate 216. The first, second, third, and fourth light detectors 508, 516, 524, and 532 receive light at a non-90 degree angle with respect to the lower surface 212 of the substrate 216.

The first, second, third, and fourth light sources 504, 512, 520, and 528 transmit light at different locations on the substrate 216, as shown. For example, the first light source 504 transmits light to the first location near the edge of the substrate 216 and the second light source 512 transmits light to the second location at or near the center of the substrate 216. The third and fourth light sources 520 and 528 transmit light to third and fourth locations between the edge and the center of the substrate 216.

Figure 9:
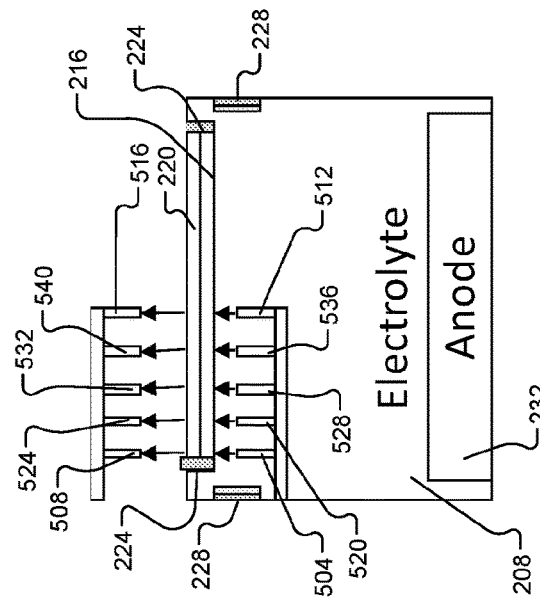

FIG. 9 includes a cross-sectional view including an example portion of the chamber 204. In various implementations, The first, second, third, and fourth light sources 504, 512, 520, and 528 transmit light normal to the lower surface 212 of the substrate 216. The first, second, third, and fourth light sources 504, 512, 520, and 528 may transmit light through the substrate 216 and the first cathode 220. The first, second, third, and fourth light detectors 508, 516, 524, and 532 may be arranged above the first cathode 220 and receive light from the first, second, third, and fourth light sources 504, 512, 520, and 528 through the substrate 216 and the first cathode 220. As thickness of material deposited at a location on the substrate 216 increases, light transmission through the substrate 216 at that location decreases as more light is reflected (by the material). The amount of light received by the first, second, third, and fourth light detectors 508, 516, 524, and 532 may decrease as thickness of the material at the locations where the first, second, third, and fourth light sources 504, 512, 520, and 528 output light increases.

Figure 10:
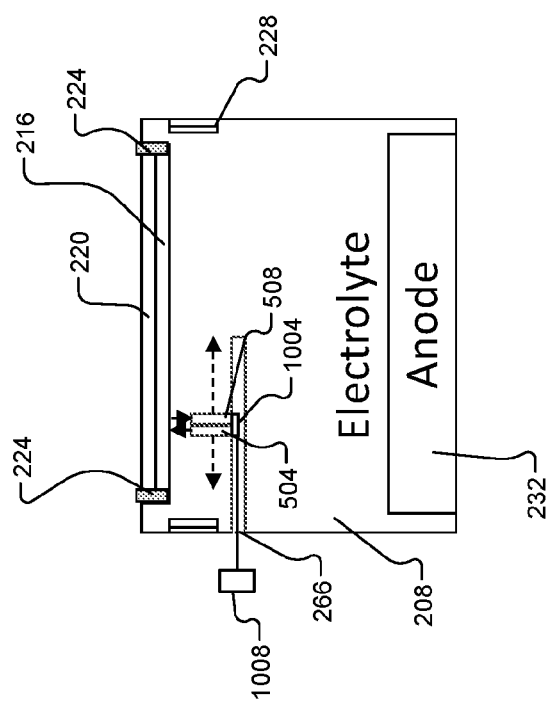

FIG. 10 includes a cross-sectional view including an example portion of the chamber 204. In the example of FIG. 10, the first light source 504 and the first light detector 508 move radially inwardly and outwardly. For example, the first light source 504 and the first light detector 508 may sit on a trolley 1004 that slides along a track in the bar 266. An actuator 1008 may push and pull the trolley 1004, thereby moving the first light source 504 and the first light detector 508 radially inwardly and outwardly. The actuator 1008 may move the first light source 504 and the first light detector 508 from a radially outer position to a radially inner position and back to the radially outer position at a frequency.

The optical probes may be configured to transmit and receive light of only a single wavelength or light within a range of wavelengths.

Figure 11:
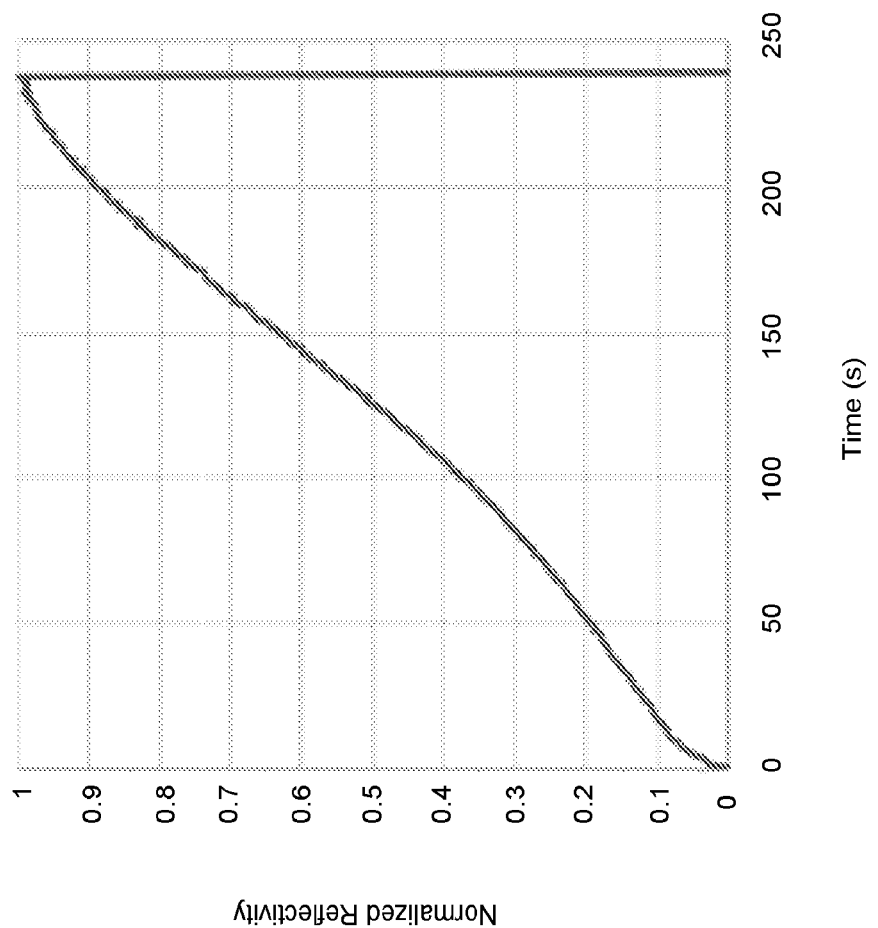
FIG. 11 includes an example graph of normalized reflectivity at a location on a substrate as a function of plating time.

FIG. 11 is an example graph of normalized reflectivity at a location on the substrate 216 as a function of plating time. As shown, normalized reflectivity is 0 at the start of the deposition of the material. As time passes, the normalized reflectivity increases. The normalized reflectivity reaches 1 when deposition of the material is complete.

Figure 12B:
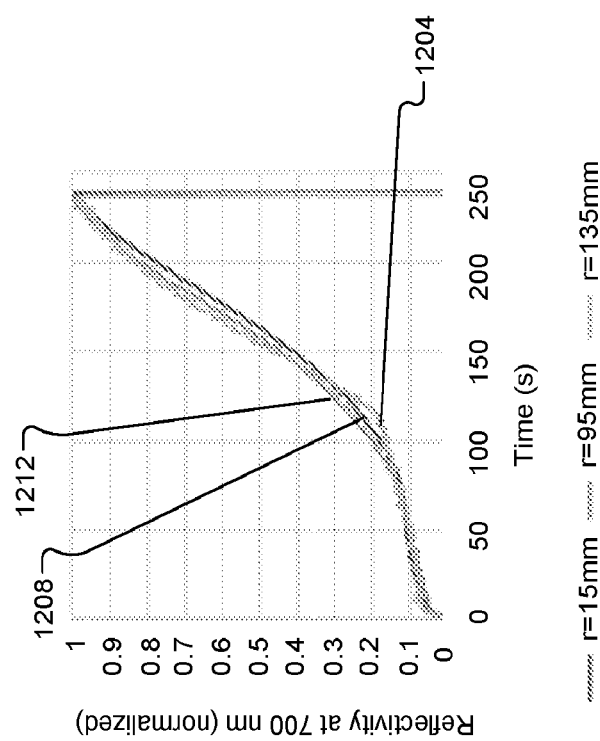
FIG. 12B includes an example graph of normalized reflectivity at three different locations on a substrate as a function of plating time with at least one of current of the second cathode, and distance between the substrate and the anode adjusted during electrochemical deposition.
Figure 12A:
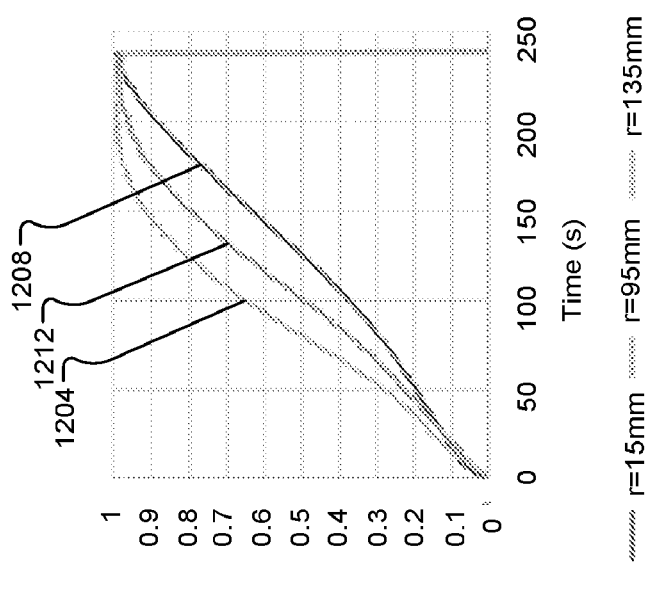
FIG. 12A includes an example graph of normalized reflectivity at three different locations on a substrate as a function of plating time.

FIG. 12A includes an example graph of normalized reflectivity at three different locations on the substrate 216 as a function of plating time. Trace 1204 tracks normalized reflectivity at a first location near the edge of the substrate 216 (e.g., measured by the first light detector 508, radius r=135 mm from center). Trace 1208 tracks normalized reflectivity at a second location near the center of the substrate 216 (e.g., measured by the second light detector 516, radius r=15 mm from center). Trace 1212 tracks normalized reflectivity at a third location between the first and second locations (e.g., measured by the fourth light detector 532, radius r=95 mm from center). As illustrated, normalized reflectivity increases and approaches 1 more quickly near the edges of the substrate 216 than near the center of the substrate 216.

FIG. 12B includes an example graph of normalized reflectivity at three different locations on the substrate 216 as a function of plating time with at least one of current of the second cathode 228 and distance between the substrate 216 and the anode 232 adjusted during electrochemical deposition, as discussed further below. As shown, the deposition occurs at approximately the same rate across the surface of the substrate 216. In other words, fill rate is approximately uniform across the substrate 216. The substrate 216 may therefore have a more uniform thickness of the material deposited.

Figure 13:
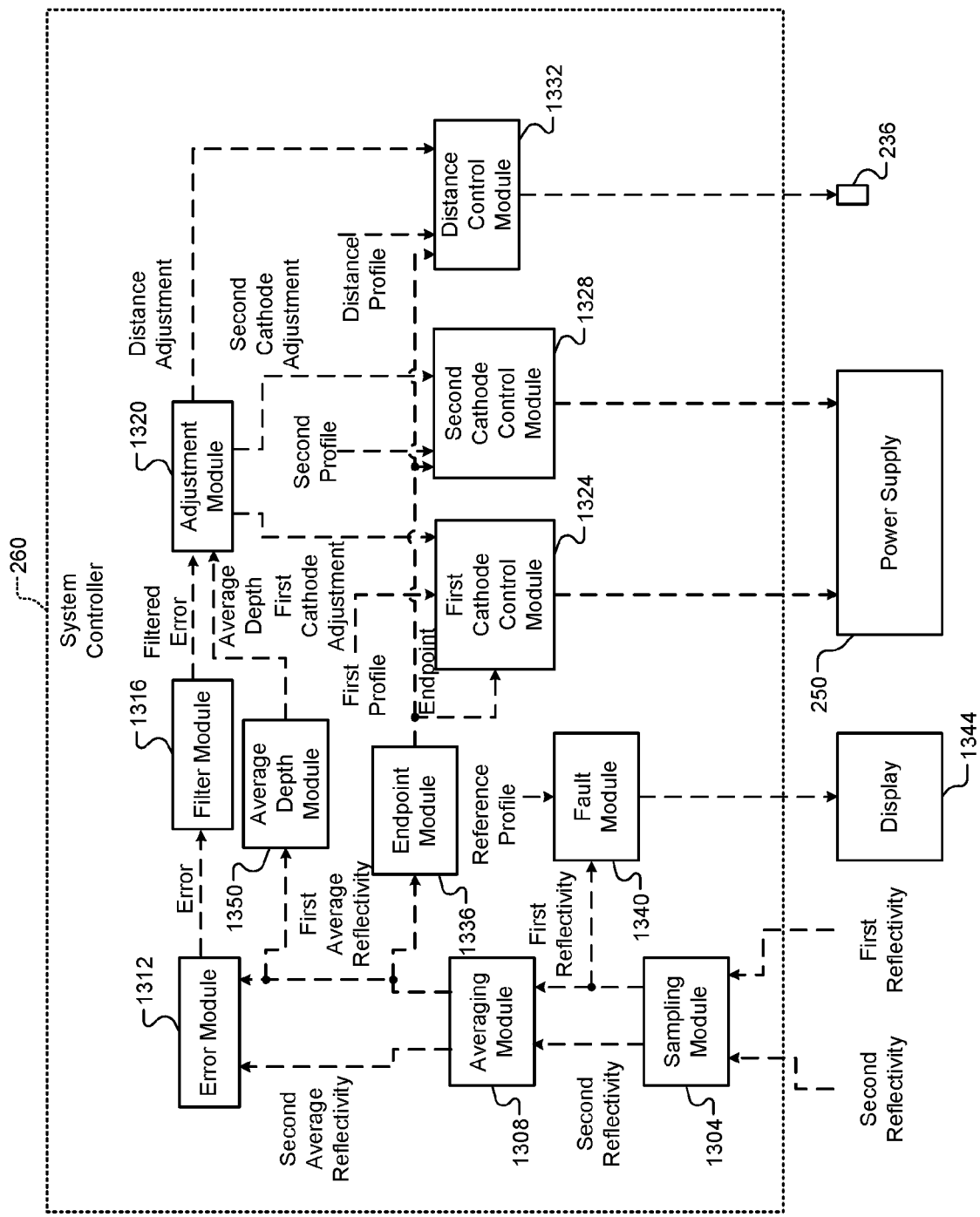
FIG. 13 includes a functional block diagram of an example implementation of a system controller.

FIG. 13 includes a functional block diagram of an example implementation of the system controller 260. A sampling module 1304 samples and digitizes a first reflectivity measured by a first one of the light detectors and a second reflectivity measured by a second one of the light detectors a number of times per revolution of the substrate holder 218. For example only, the sampling module 1304 may sample the first reflectivity and the second reflectivity 40 the number of equally spaced times per revolution of the substrate holder 218 or at another suitable rate. The first one of the light detectors (e.g., the second light detector 516) and the second one of the light detectors (e.g., the first light detector 508) receive light from different radial locations on the substrate 216 during deposition of the material on the substrate 216.

An averaging module 1308 averages the first reflectivities measured over a period to determine a first average reflectivity. The averaging module 1308 also averages the second reflectivities measured over the period to determine a second average reflectivity. The period may be, for example, one revolution of the substrate holder 218 or another suitable period. The period may be moving or non-moving.

An error module 1312 determines an error between the first average reflectivity and the second average reflectivity. For example, the error module 1312 may set the error based on or equal to the first average reflectivity minus the second average reflectivity. In the example of FIG. 10, the error module 1312 may set the error based on or equal to a difference between a first reflectivity measured by the first light detector 508 at a first time when the first light detector 508 is at a first radial position and a second reflectivity measured by the first light detector 508 at a second time when the first light detector 508 is at a second radial position that is different than the first radial position.

A filtering module 1316 applies one or more filters to the error to produce a filtered error. For example, the filtering module 1316 may apply (e.g., multiply) one or more weighting values to the error based on the locations on the substrate 216 associated with the first and second light detectors. The filtering module 1316 may additionally or alternatively apply a rate limit to changes in the error to smooth the filtered error.

An adjustment module 1320 selectively sets one or more adjustments based on the filtered error. For example, the adjustment module 1320 may increase or decrease at least one of a first cathode adjustment, a second cathode adjustment, or a distance adjustment based on the filtered error. The adjustment module 1320 adjusts at least one of the first cathode adjustment, the second cathode adjustment, or the distance adjustment to adjust the filtered error (and the error) toward zero. The first cathode adjustment may be used to vary current of the first cathode 220 relative to a first cathode profile. The first cathode profile includes a series of values of power to apply to the first cathode 220 over time during the deposition of the material on the substrate 216.

A first cathode control module 1324 controls power applied by the power supply to the first cathode 220 based on the first cathode profile and the first cathode adjustment. For example, the first cathode control module 1324 may multiply or add the first cathode adjustment to the values of the first cathode profile and control the power applied to the first cathode 220 over time based on the result of the multiplication or addition.

The second cathode adjustment may be used to vary current of the second cathode 228 relative to a second cathode profile. The second cathode profile includes a series of values of power to apply to the second cathode 228 over time during the deposition of the material on the substrate 216.

A second cathode control module 1328 controls power applied by the power supply to the second cathode 228 based on the second cathode profile and the second cathode adjustment. For example, the second cathode control module 1328 may multiply or add the second cathode adjustment to the values of the second cathode profile and control the power applied to the second cathode 228 over time based on the results of the multiplication or addition.

The distance adjustment may be used to vary the distance between the substrate 216 and the anode 232 relative to a distance profile. The distance profile includes a series of distances between the substrate and the anode 232 over time during the deposition of the material on the substrate 216.

A distance control module 1332 actuates the first actuator 236 based on the distance profile and the distance adjustment. For example, the distance control module 1332 may multiply or add the distance adjustment to the values of the distance profile and actuate the first actuator 236 over time based on the results of the multiplication or addition.

Adjusting the power applied to the first cathode 220, the power applied to the second cathode 228, and/or the distance between the substrate 216 and the anode 232 during the electrochemical deposition based on the in-situ optical measurements of the optical probes may decrease defect counts of the substrate 216 and/or increase uniformity of the deposited material. While the example of the first and second reflectivities is provided, at least one of the first cathode adjustment, the second cathode adjustment, and the distance adjustment may additionally or alternatively be set based on one or more other pairs of reflectivities measured by one or more other pairs of light detectors. Furthermore, at least one of the first cathode adjustment, the second cathode adjustment, and the distance adjustment may be additionally or alternatively set based on more than two reflectivity signals. In the example of more than two reflectivity signals, the error module 1312 may weight each of the reflectivity signals to produce the error.

While the example of the distance between the substrate 216 and the anode 232 is discussed above, geometry may be additionally or alternatively adjusted in one or more ways based on the error. For example, the system controller 260 may adjust a distance between the first cathode 220 and the second cathode 228, a position or dimension of one or more field-shaping components (e.g., the first cathode 220, the second cathode 228, and/or the anode 232), and/or an angle of the substrate 216 in electrolyte 208 may be adjusted.

An endpoint module 1336 detects endpoints of the electrochemical deposition during the electrochemical deposition based on at least one of the reflectivities, such as the first reflectivity. The endpoint module 1336 may detect an endpoint, for example, when a reflectivity crosses an endpoint reflectivity, a rate of change of the reflectivity becomes less than an endpoint rate of change, or when the reflectivity achieves another suitable criteria.

At least one of the first cathode control module 1324, the second cathode control module 1328, and the distance control module 1332 may adjust the power applied to the first cathode 220, the power applied to the second cathode 228, and the distance, respectively, when an endpoint is detected. For example, the first cathode control module 1324 may select a different first profile when an endpoint is detected. Additionally or alternatively, the second cathode control module 1328 may select a different second profile when an endpoint is detected. Additionally or alternatively, the distance control module 1332 may select a different distance profile when an endpoint is detected.

While the example of use of an average reflectivity is shown, a non-averaged reflectivity may be used. The use of a non-averaged reflectivity (e.g., the first reflectivity) may allow for a reflectivity of the substrate surface to be mapped for each revolution. This would provide a series of detailed snapshots that could be used to monitor the evolution (over time) of local differences in reflectivity on the substrate 216. This may be useful where the substrate is initially more resistive and therefore more prone to more rapid deposition of the material in less resistive pathways. These less resistive pathways may form at the azimuthal positions on the edge of the substrate 216 where either nucleation stochastically initiates before other areas or the contact resistance is minimized. This may allow for observation of pathway formation in real time, and allow for tuning of at least one of the adjustments based on the in-situ data from the light detectors to avoid the potentially defect-causing phenomenon of pathway formation.

A fault module 1340 diagnoses the presence of one or more faults during the electrochemical deposition based on the first reflectivity. A reference profile includes a series of reference first reflectivities over time during the electrochemical deposition when no faults are present. When a value of the first reflectivity at a given time is greater than or less than the reference first reflectivity at that time by at least a predetermined amount, the fault module 1340 may diagnose the presence of a fault. While the example of the first reflectivity is used, the fault module 1340 may diagnose the presence of a fault additionally or alternatively based on one or more other reflectivities.

The fault module 1340 may take one or more actions when a fault is diagnosed. For example, the fault module 1340 may display a predetermined fault message on a display 1344.

In the example of the light detectors detecting only a single wavelength of light, the presence of interference fringes may be observed as the features fill from bottom-up. For example, destructive interference may occur when the average distance between the top reflecting surface (e.g., an unetched area) and the bottom reflecting surface (an etched area) is equal to or approximately equal to $n\lambda/4$, where n is an integer and $\lambda$ is the wavelength of the light. Constructive interference may occur when the average distance is equal to or approximately equal to $n\lambda/2$.

Figure 14:
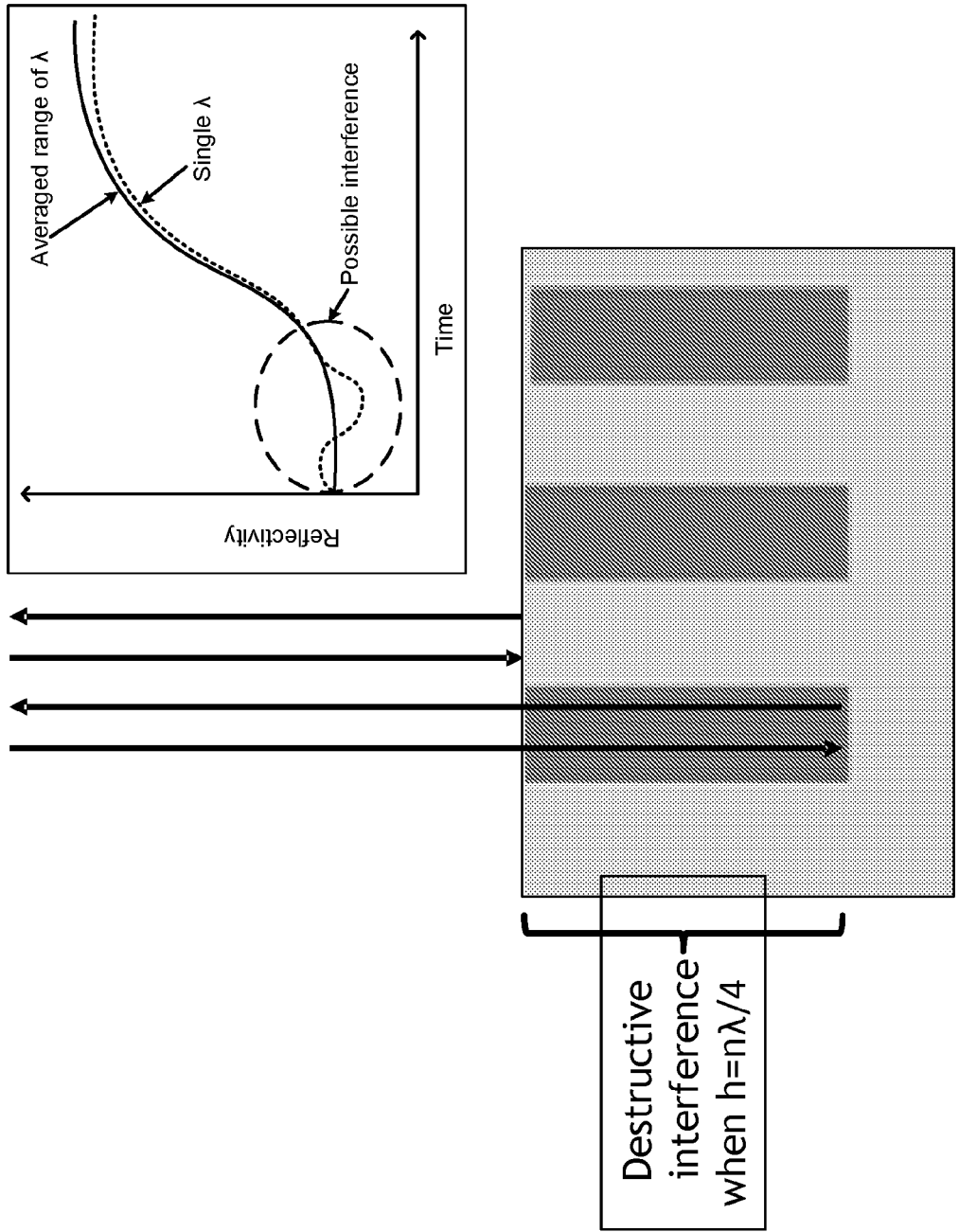
FIG. 14 includes an example graph illustrating the interference for the example where the incident and reflected light is normal to the substrate and an example graph of wavelength averaged reflectivity as a function of time.

FIG. 14 includes an example graph illustrating the destructive interference when the average distance is equal to $n\lambda/4$ for the example where the incident and reflected light is normal to the substrate 216. FIG. 14 also includes an example graph of wavelength averaged reflectivity as a function of time.

As shown in FIG. 13, an average depth module 1350 may compare the averaged reflectivity versus time profile to a reference average reflectivity versus time profile to determine where constructive and destructive interference occur and, therefore feature depth. This can be performed for each wavelength sampled. This may improve estimates of a mean and a standard deviation of feature depths in a sample area.

The adjustment module 1320 may determine the first cathode adjustment additionally or alternatively based on the average depth. For example, the adjustment module 1320 may determine the first cathode adjustment using one of a lookup table and an equation that relates average depths to first cathode adjustments. The adjustment module 1320 may additionally or alternatively determine the second cathode adjustment and/or the distance adjustment based on the average depth. Adjustment based on the average depth may remove variation due to azimuthal non-uniformity and may increase a signal to noise ratio for any changes in radial (e.g., center to edge) non-uniformity.

Figure 15:
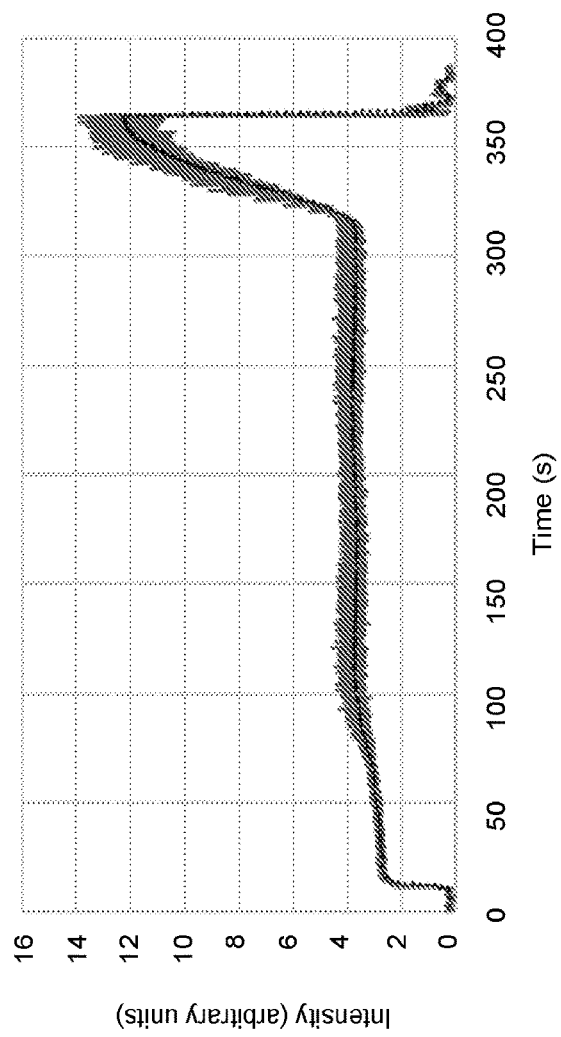
FIG. 15 includes an example graph of a first reflectivity over time during the electrochemical deposition.
Figure 16:
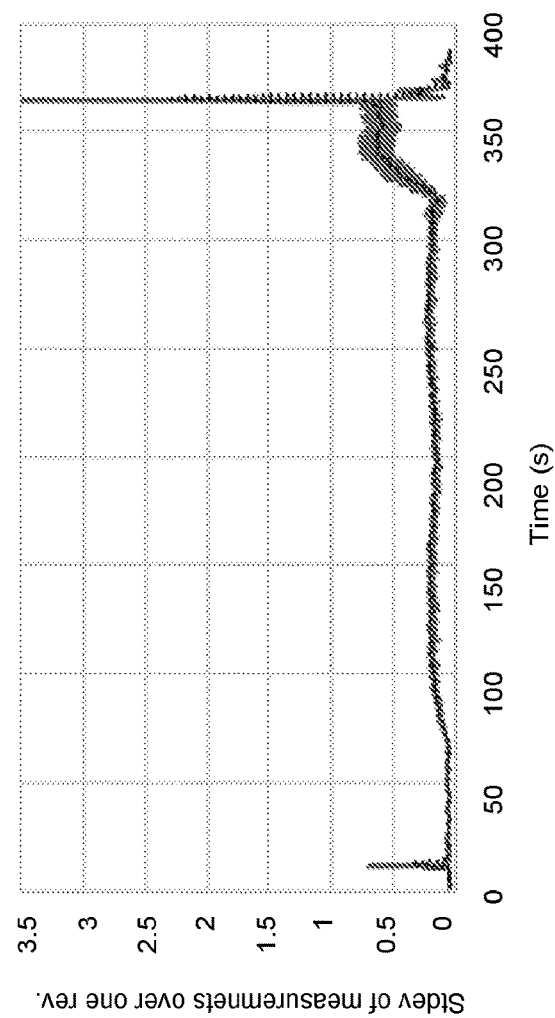
FIG. 16 includes an example of a rolling standard deviation of the first average reflectivity over time during the electrochemical deposition.

FIG. 15 includes an example graph of the first (non-averaged) reflectivity over time during the electrochemical deposition. FIG. 16 includes an example of a rolling standard deviation of the first average reflectivity over time during the electrochemical deposition. The endpoint module 1336 may detect an endpoint based on the first average reflectivity, the first reflectivity, or the rolling standard deviation of the first average reflectivity becoming greater or less than a respective value.

Figure 17:
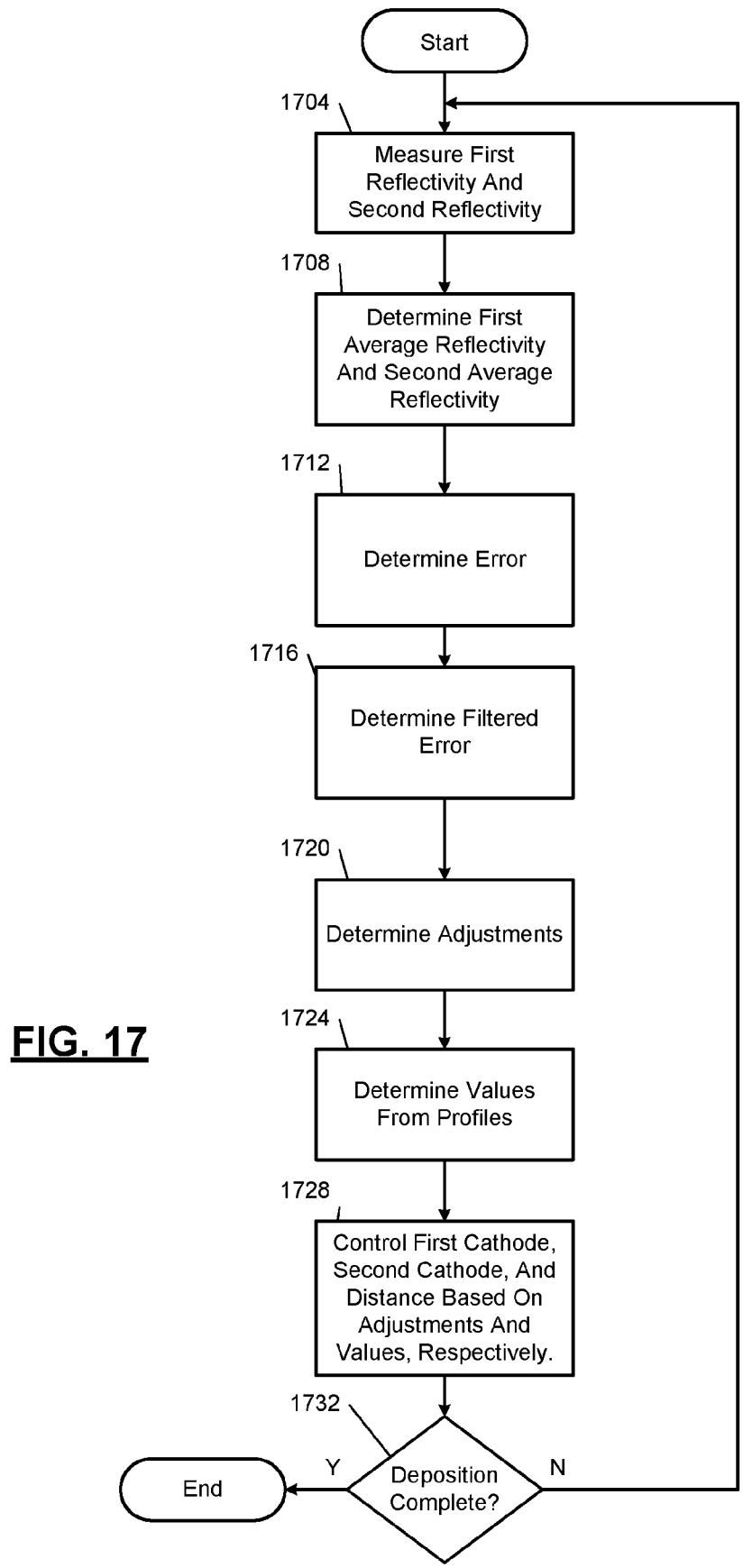
FIG. 17 includes a flowchart depicting an example method of controlling power applied to a first cathode, a second cathode, and a distance between a substrate and an anode during electrochemical deposition.

FIG. 17 includes a flowchart depicting an example method of controlling power applied to the first cathode 220, the second cathode 228, and the distance between the substrate 216 and the anode 232 during electrochemical deposition. Control begins with 1704 where the first and second light detectors 508 and 516 measure the first and second reflectivities of the substrate 216 at the first and second locations, respectively. The first and second light detectors 508 and 516 measure the first and second reflectivities while the substrate 216 is being rotated within the electrolyte 208, the first and second light sources 504 and 512 are outputting light to the first and second locations, and the substrate 216 is held to the substrate holder 218.

At 1708, the averaging module 1308 determines the first and second average reflectivities. At 1712, the error module 1312 determines the error based on a difference between the second average reflectivity and the first average reflectivity. At 1716 the filtering module 1316 generates the filtered error based on the error. At 1720, the adjustment module 1320 determines the first cathode adjustment, the second cathode adjustment, and the distance adjustment based on the filtered error.

At 1724, the first cathode control module 1324 selects a first value (for applying power to the first cathode 220) for the present time during the deposition from the first profile. Also, the second cathode control module 1328 selects a second value (for applying power to the second cathode 228) for the present time during the deposition from the second profile. Also, the distance control module 1332 selects a third value (for the distance between the substrate 216 and the anode 232) for the present time during the deposition from the third profile.

At 1728, the first cathode control module 1324 controls the power applied to the first cathode 220 based on the first value and the first cathode adjustment. For example, the first cathode control module 1324 may apply power to the first cathode 220 based on or equal to (i) the first cathode adjustment plus the first value or (ii) the first cathode adjustment multiplied by the first value. The second cathode control module 1328 controls the power applied to the second cathode 228 based on the second value and the second cathode adjustment. For example, the second cathode control module 1328 may apply power to the second cathode 228 based on or equal to (i) the second cathode adjustment plus the second value or (ii) the second cathode adjustment multiplied by the second value. The distance control module 1332 controls the controls the distance between the substrate 216 and the anode 232 based on the third value and the distance adjustment. For example, the distance control module 1332 may actuate the first actuator 236 to achieve a distance that is based on or equal to (i) the distance adjustment plus the third value or (ii) the distance adjustment multiplied by the third value.

At 1732, the system controller 260 may determine whether deposition of the material on the substrate 216 is complete. If 1732 is true, the system controller 260 may disable the first cathode 220 and the second cathode 228. The system controller 260 may also remove the substrate 216 from the electrolyte 208. If 1732 is false, control may return to 1704.

FIG. 18 includes a cross-sectional view of an electrochemical deposition system including an example portion of the chamber 204. In the example of FIG. 18, the chamber 204 is an electrochemical deposition chamber and is configured to contain the electrolyte 208 for electrochemical deposition. The substrate holder 218 includes the first cathode 220. The first actuator 236 is configured to raise and lower the substrate holder 218 and thereby to adjust a vertical position of the substrate holder 218 within the chamber 204. The chamber 204 also includes the anode 232 and the second cathode 228. The second cathode 228 is arranged between the first cathode 220 and the anode 232. The optical probe 264 is configured to measure a reflectivity of the substrate 216 during electrochemical deposition. While an example location of the optical probe 264 is provided, the optical probe 264 may be located in another suitable location.

FIG. 19 includes a cross-sectional view of an electrochemical deposition system including an example portion of the chamber 204 of FIG. 18. As shown in FIG. 19, a second one of the optical probes 264 is included. The second one of the optical probes 264 is configured to measure a second reflectivity of the substrate during the electrochemical deposition.

In FIG. 18, the optical probe 264 includes: the first light source 504 configured to transmit light normal to a surface of the substrate; and the first light detector 508 configured to receive light normal to the surface of the substrate.

Figure 20:
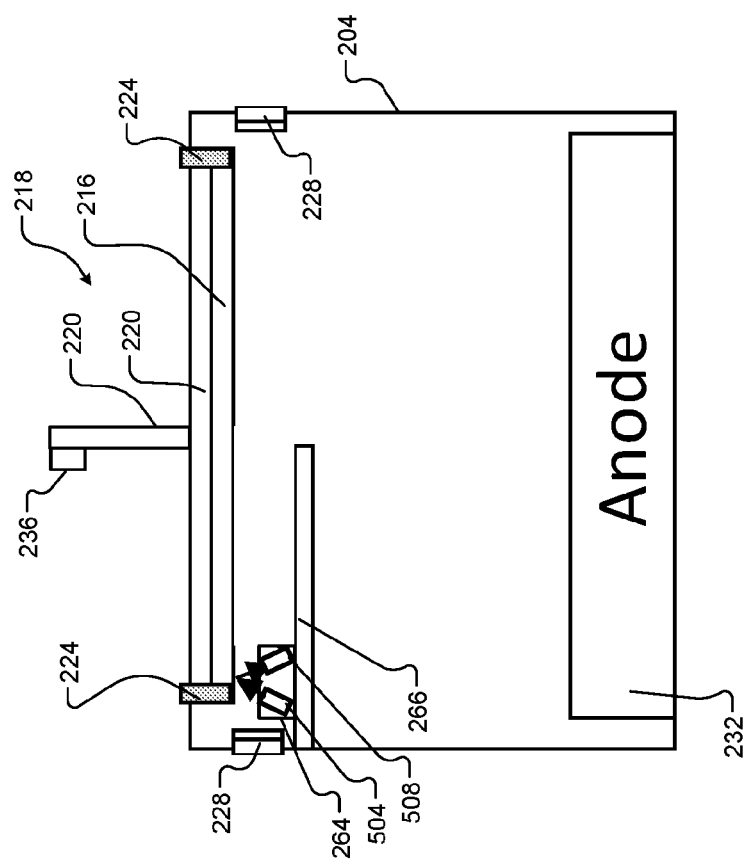

FIG. 20 includes a cross-sectional view of an electrochemical deposition system including an example portion of the chamber 204 of FIG. 18. In FIG. 20, the optical probe 264 includes: the first light source 504 configured to transmit light at a non-90 degree angle with respect to a surface of the substrate; and the first light detector 508 configured to receive light at a non-90 degree angle with respect to the surface.

Figure 21:
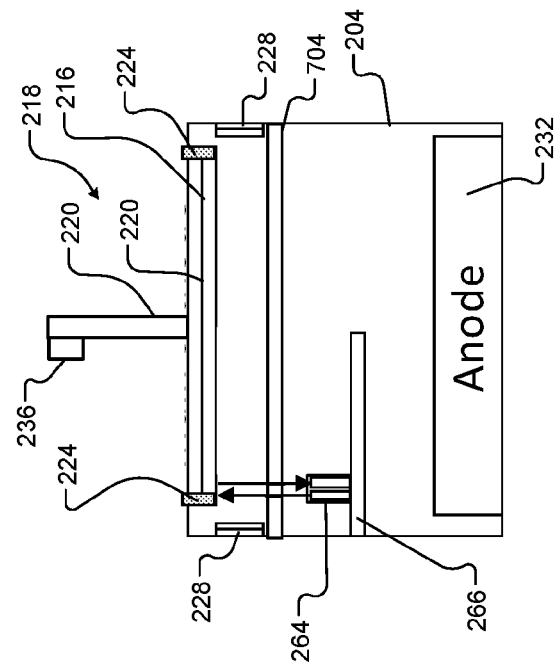

FIG. 21 includes a cross-sectional view of an electrochemical deposition system including an example portion of the chamber 204 of FIG. 18. In the example of FIG. 21, the window 704 is located between the optical probe 264 and the substrate 216. The optical probe 264 is configured to transmit and receive light through the window 704.

FIG. 22 includes a cross-sectional view of an electrochemical deposition system including an example portion of the chamber 204 of FIG. 18. In the example of FIG. 22, the optical probe 264 includes: the first light source 504 configured to transmit light normal to a surface of the substrate 216; and the first light detector 508 configured to receive light through the substrate 216.

In the example of FIG. 18, the optical probe 264 is located on the bar 266.

FIG. 23 includes a cross-sectional view of an electrochemical deposition system including an example portion of the chamber 204 of FIG. 18. In the example of FIG. 23, the optical probe 264 includes the first light source 504 and the first light detector 508 and is mounted to a wall of the electrochemical deposition chamber 204.

In the example of FIG. 18, the optical probe 264 is configured to transmit and receive only a single wavelength of light or light within a wavelength range.

FIG. 24 includes a cross-sectional view of an electrochemical deposition system including an example portion of the chamber 204 of FIG. 18. In the example of FIG. 24, the second actuator 240 is configured to move the optical probe 264 one of toward and away from a center of the substrate 216.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In some implementations, a controller is part of a system, which may be part of the above-described examples. Such systems can comprise semiconductor processing equipment, including a processing tool or tools, chamber or chambers, a platform or platforms for processing, and/or specific processing components (a wafer pedestal, a gas flow system, etc.). These systems may be integrated with electronics for controlling their operation before, during, and after processing of a semiconductor wafer or substrate. The electronics may be referred to as the "controller," which may control various components or subparts of the system or systems. The controller, depending on the processing requirements and/or the type of system, may be programmed to control any of the processes disclosed herein, including the delivery of processing gases and/or liquids, temperature settings (e.g., heating and/or cooling), pressure settings, vacuum settings, power settings, radio frequency (RF) generator settings, RF matching circuit settings, frequency settings, flow rate settings, fluid delivery settings, positional and operation settings, wafer transfers into and out of a tool and other transfer tools and/or load locks connected to or interfaced with a specific system.

Broadly speaking, the controller may be defined as electronics having various integrated circuits, logic, memory, and/or software that receive instructions, issue instructions, control operation, enable cleaning operations, enable endpoint measurements, and the like. The integrated circuits may include chips in the form of firmware that store program instructions, digital signal processors (DSPs), chips defined as application specific integrated circuits (ASICs), and/or one or more microprocessors, or microcontrollers that execute program instructions (e.g., software). Program instructions may be instructions communicated to the controller in the form of various individual settings (or program files), defining operational parameters for carrying out a particular process on or for a semiconductor wafer or to a system. The operational parameters may, in some embodiments, be part of a recipe defined by process engineers to accomplish one or more processing steps during the fabrication of one or more layers, materials, metals, oxides, silicon, silicon dioxide, surfaces, circuits, and/or dies of a wafer.

The controller, in some implementations, may be a part of or coupled to a computer that is integrated with the system, coupled to the system, otherwise networked to the system, or a combination thereof. For example, the controller may be in the "cloud" or all or a part of a fab host computer system, which can allow for remote access of the wafer processing. The computer may enable remote access to the system to monitor current progress of fabrication operations, examine a history of past fabrication operations, examine trends or performance metrics from a plurality of fabrication operations, to change parameters of current processing, to set processing steps to follow a current processing, or to start a new process. In some examples, a remote computer (e.g. a server) can provide process recipes to a system over a network, which may include a local network or the Internet. The remote computer may include a user interface that enables entry or programming of parameters and/or settings, which are then communicated to the system from the remote computer. In some examples, the controller receives instructions in the form of data, which specify parameters for each of the processing steps to be performed during one or more operations. It should be understood that the parameters may be specific to the type of process to be performed and the type of tool that the controller is configured to interface with or control. Thus as described above, the controller may be distributed, such as by comprising one or more discrete controllers that are networked together and working towards a common purpose, such as the processes and controls described herein. An example of a distributed controller for such purposes would be one or more integrated circuits on a chamber in communication with one or more integrated circuits located remotely (such as at the platform level or as part of a remote computer) that combine to control a process on the chamber.

Without limitation, example systems may include a plasma etch chamber or module, a deposition chamber or module, a spin-rinse chamber or module, a metal plating chamber or module, a clean chamber or module, a bevel edge etch chamber or module, a physical vapor deposition (PVD) chamber or module, a chemical vapor deposition (CVD) chamber or module, an atomic layer deposition (ALD) chamber or module, an atomic layer etch (ALE) chamber or module, an ion implantation chamber or module, a track chamber or module, and any other semiconductor processing systems that may be associated or used in the fabrication and/or manufacturing of semiconductor wafers.

As noted above, depending on the process step or steps to be performed by the tool, the controller might communicate with one or more of other tool circuits or modules, other tool components, cluster tools, other tool interfaces, adjacent tools, neighboring tools, tools located throughout a factory, a main computer, another controller, or tools used in material transport that bring containers of wafers to and from tool locations and/or load ports in a semiconductor manufacturing factory.

What is claimed is:

1. An electrochemical deposition system comprising:
an electrochemical deposition chamber including an electrolyte for electrochemical deposition;
a substrate holder configured to hold a substrate and including a first cathode that is electrically connected to the substrate;
a first actuator configured to adjust a vertical position of the substrate holder within the electrochemical deposition chamber;
an anode that is submerged in the electrolyte;
a second cathode that is arranged between the first cathode and the anode;
a first optical probe configured to measure a first reflectivity of the substrate at a first distance from a center of the substrate while the substrate is submerged within the electrolyte during the electrochemical deposition;
a second actuator configured to, while the substrate is submerged within the electrolyte, move the first optical probe from the first distance from the center of the substrate to a second distance from the center of the substrate that is different than the first distance; and
a controller is configured to, during the electrochemical deposition, based on a first value of the first reflectivity measured when the first optical probe is the first distance from the center of the substrate and a second value of the first reflectivity measured when the first optical probe is the second distance from the center of the substrate, selectively adjust the at least one of (i) the power applied to the first cathode, (ii) the power applied to the second cathode, (iii) the power applied to the anode, and (iv) the vertical position of the substrate holder.

2. The electrochemical deposition system of claim 1 further comprising:
a second optical probe configured to measure a second reflectivity of the substrate at a second distance from the center of the substrate while the substrate is submerged within the electrolyte during the electrochemical deposition,
wherein the controller is configured to, during the electrochemical deposition, further based on the second reflectivity of the substrate, selectively adjust at least one of (i) the power applied to the first cathode, (ii) the power applied to the second cathode, (iii) the power applied to the anode, and the (iv) vertical position of the substrate holder.

3. The electrochemical deposition system of claim 2 wherein the first distance is different than the second distance.

4. The electrochemical deposition system of claim 1 wherein the controller is configured to, during the electrochemical deposition, based on a difference between the first value and the second value, selectively adjust at least one of (i) the power applied to the first cathode, (ii) the power applied to the second cathode, (iii) the power applied to the anode, and the (iv) vertical position of the substrate holder.

5. The electrochemical deposition system of claim 4 wherein the controller is configured to, during the electrochemical deposition:
determine a first adjustment based on the difference; and
apply power to the first cathode based on the first adjustment and a value selected from a first profile.

6. The electrochemical deposition system of claim 4 wherein the controller is configured to, during the electrochemical deposition:
determine a second adjustment based on the difference; and
apply power to the second cathode based on the second adjustment and a value selected from a second profile.

7. The electrochemical deposition system of claim 4 wherein the controller is configured to, during the electrochemical deposition:
determine a third adjustment based on the difference; and
adjust the vertical position of the substrate holder based on the third adjustment and a value selected from a third profile.

8. The electrochemical deposition system of claim 1 wherein the first optical probe includes:
a first light source configured to transmit light normal to a surface of the substrate while the substrate is submerged within the electrolyte during the electrochemical deposition; and
a first light detector configured to receive light normal to the surface of the substrate while the substrate is submerged within the electrolyte during the electrochemical deposition.

9. The electrochemical deposition system of claim 1 further comprising a window located between the first optical probe and the substrate,
wherein the first optical probe is configured to transmit and receive light through the window while the substrate is submerged within the electrolyte during the electrochemical deposition.

10. The electrochemical deposition system of claim 1 wherein the first optical probe includes:
a first light source configured to transmit light normal to a surface of the substrate while the substrate is submerged within the electrolyte during the electrochemical deposition; and
a first light detector configured to receive light through the substrate while the substrate is submerged within the electrolyte during the electrochemical deposition.

11. The electrochemical deposition system of claim 1 further comprising a bar,
wherein the first optical probe is located on the bar.

12. The electrochemical deposition system of claim 1 wherein the first optical probe is configured to transmit and receive only a single wavelength of light.

13. The electrochemical deposition system of claim 1 wherein the first optical probe is configured to transmit and receive light within a wavelength range.

14. The electrochemical deposition system of claim 1 further comprising a third actuator configured to rotate the substrate holder during the electrochemical deposition.

15. The electrochemical deposition system of claim 1 wherein the controller is further configured to, during the electrochemical deposition:
based on the first value of the first reflectivity of the substrate, detect an endpoint of the electrochemical deposition; and
in response to the detection of the endpoint, selectively adjust at least one of (i) the power applied to the first cathode, (ii) the power applied to the second cathode, (iii) the power applied to the anode, and (iv) the vertical position of the substrate holder.

16. The electrochemical deposition system of claim 1 wherein the controller is further configured to, during the electrochemical deposition:
based on the first value of the first reflectivity of the substrate, determine a depth of features formed in the substrate; and
based on the depth of the features formed in the substrate, selectively adjust at least one of (i) the power applied to the first cathode, (ii) the power applied to the second cathode, (iii) the power applied to the anode, and (iv) the vertical position of the substrate holder.

17. The electrochemical deposition system of claim 1 wherein the controller is further configured to, during the electrochemical deposition:
based on the first value of the first reflectivity of the substrate, detect a fault; and
in response to the detection of the fault, display an indicator of the fault on a display.

18. The electrochemical deposition system of claim 1 wherein the controller is configured to:
determine an average of a plurality of first values of first reflectivity of the substrate measured during an amount of rotation of the substrate during the electrochemical deposition; and
during the electrochemical deposition, based on the average, selectively adjust at least one of (i) the power applied to the first cathode, (ii) the power applied to the second cathode, (iii) the power applied to the anode, and (iv) the vertical position of the substrate holder.

19. The electrochemical deposition system of claim 1, wherein the controller is further configured to, during the electrochemical deposition, additionally selectively adjust at least one of (v) an angle of the substrate, and (vi) a distance between the first cathode and the second cathode.

* * * * *